United States Patent
Richter et al.

(10) Patent No.: US 7,377,574 B2
(45) Date of Patent: May 27, 2008

(54) RETRACTING MECHANISM FOR USE WITH BOTH HARD AND HYBRID RETRACTABLE TOPS FOR VEHICLES

(75) Inventors: Wolfgang Richter, Commerce Township, MI (US); David Connolly, Highland, MI (US); Markus Wulf, Commerce Township, MI (US); Frank Neubrand, West Bloomfield, MI (US)

(73) Assignee: Wilhelm Karmann GmbH, Osnabruck (DE)

( * ) Notice: Subject to any disclaimer, the term of this patent is extended or adjusted under 35 U.S.C. 154(b) by 255 days.

(21) Appl. No.: 11/037,967

(22) Filed: Jan. 18, 2005

(65) Prior Publication Data

US 2005/0127708 A1  Jun. 16, 2005

Related U.S. Application Data

(63) Continuation-in-part of application No. 10/640,517, filed on Aug. 13, 2003, now Pat. No. 7,118,161.

(60) Provisional application No. 60/536,912, filed on Jan. 16, 2004, provisional application No. 60/445,094, filed on Feb. 5, 2003, provisional application No. 60/403,601, filed on Aug. 14, 2002.

(51) Int. Cl.
  *B60J 7/12* (2006.01)
  *B60J 7/14* (2006.01)

(52) U.S. Cl. .................. 296/107.15; 296/108; 296/121; 296/107.09; 296/107.16; 296/107.17

(58) Field of Classification Search ........... 296/107.01, 296/107.08, 107.09, 107.16, 107.15, 108, 296/109, 116, 112, 115, 117, 121, 122, 107.17, 296/107.2, 107.008

See application file for complete search history.

(56) References Cited

U.S. PATENT DOCUMENTS

| 2,011,723 | A | * | 8/1935 | Miller | ........................ 296/121 |
| 2,141,842 | A | | 12/1938 | Lohrman | |
| 2,181,869 | A | | 12/1939 | Carr | |
| 2,794,672 | A | | 6/1957 | Burzi | |
| 4,634,171 | A | | 1/1987 | McKeag | |
| 4,828,317 | A | * | 5/1989 | Muscat | ...................... 296/122 |
| RE34,003 | E | * | 7/1992 | Weng | ........................ 360/72.2 |
| 5,161,852 | A | | 11/1992 | Alexander et al. | |
| 5,207,474 | A | | 5/1993 | Licher | |
| 5,286,077 | A | | 2/1994 | Kinnanen | |
| 5,785,375 | A | | 7/1998 | Alexander et al. | |

(Continued)

FOREIGN PATENT DOCUMENTS

DE 695169 8/1940

(Continued)

*Primary Examiner*—D. Glenn Dayoan
*Assistant Examiner*—Greg Blankenship
(74) *Attorney, Agent, or Firm*—Gifford, Krass, Sprinkle, Anderson & Citkowski, P.C.

(57) ABSTRACT

A retractable top for a vehicle includes a front section, a middle section and a rear section. A first embodiment includes rigid front, middle and rear sections. A second embodiment includes rigid front and rear sections and a membranous middle section. A single retracting mechanism design is utilized for both the first and second embodiments, which allows selective movement of the front, middle and rear sections of the top between an open position and a closed position.

45 Claims, 21 Drawing Sheets

U.S. PATENT DOCUMENTS

| | | | |
|---|---|---|---|
| 5,848,819 A | 12/1998 | Sautter, Jr. | |
| 5,971,470 A | 10/1999 | May et al. | |
| 5,988,729 A | 11/1999 | Klein | |
| 6,139,087 A * | 10/2000 | Wolfmaier et al. | 296/107.16 |
| 6,142,555 A | 11/2000 | Huber | |
| 6,270,143 B1 * | 8/2001 | Heselhaus et al. | 296/107.01 |
| 6,315,349 B1 | 11/2001 | Kinnanen | |
| 6,334,644 B1 | 1/2002 | Gurtler et al. | |
| 6,336,673 B1 | 1/2002 | Rothe et al. | |
| 6,343,829 B2 | 2/2002 | Busch | |
| 6,364,395 B1 * | 4/2002 | Halbweiss et al. | 296/107.09 |
| 6,390,532 B1 | 5/2002 | MacFarland | |
| 6,422,637 B1 | 7/2002 | MacFarland | |
| 6,439,642 B2 | 8/2002 | MacFarland | |
| 6,478,362 B2 | 11/2002 | Obendiek | |
| 6,499,792 B2 | 12/2002 | MacFarland | |
| 6,502,891 B2 | 1/2003 | Russke | |
| 6,505,881 B2 | 1/2003 | Kinnanen | |
| 6,568,751 B2 | 5/2003 | Reinsch | |
| 6,572,175 B2 | 6/2003 | Schutt et al. | |
| 6,592,169 B2 | 7/2003 | Obendiek | |
| 6,629,719 B2 | 10/2003 | Sims | |
| 6,637,802 B2 | 10/2003 | Obendiek | |
| 6,659,533 B1 | 12/2003 | Grubbs | |
| 6,659,534 B2 | 12/2003 | Willard | |
| 6,666,495 B2 | 12/2003 | Nania | |
| 6,695,385 B1 * | 2/2004 | Lange | 296/107.12 |
| 6,695,386 B1 | 2/2004 | Willard | |
| 6,739,645 B2 | 5/2004 | Papendorf et al. | |
| 6,755,457 B2 | 6/2004 | Grubbs | |
| 6,761,392 B2 | 7/2004 | Hasselgruber et al. | |
| 6,764,127 B2 * | 7/2004 | Obendiek | 296/107.09 |
| 6,796,595 B2 | 9/2004 | Doncov | |
| 6,820,917 B2 | 11/2004 | Grubbs | |
| 2002/0003355 A1 | 1/2002 | MacFarland | |
| 2002/0074822 A1 | 6/2002 | Rothe et al. | |
| 2004/0145212 A1 | 7/2004 | MacFarland | |
| 2004/0174039 A1 | 9/2004 | Dilluvio | |

FOREIGN PATENT DOCUMENTS

| | | |
|---|---|---|
| DE | 34 16 286 A1 | 4/1984 |
| DE | 38 06 647 | 7/1989 |
| DE | 38 09 198 | 9/1989 |
| DE | 42 28 065 A1 | 4/1994 |
| DE | 43 16 485 A1 | 11/1994 |
| DE | 299 21 458 A1 | 3/2000 |
| DE | 198 46 006 A1 | 4/2000 |
| DE | 102 05 935 A1 | 8/2003 |
| EP | 0 332 811 A2 | 9/1989 |
| EP | 0 835 778 B1 | 7/2001 |
| JP | 2-306822 | 12/1990 |
| JP | 62-31516 | 12/1990 |
| JP | 6-156086 A | 6/1994 |
| WO | WO-2004/054829 | 7/2004 |

* cited by examiner

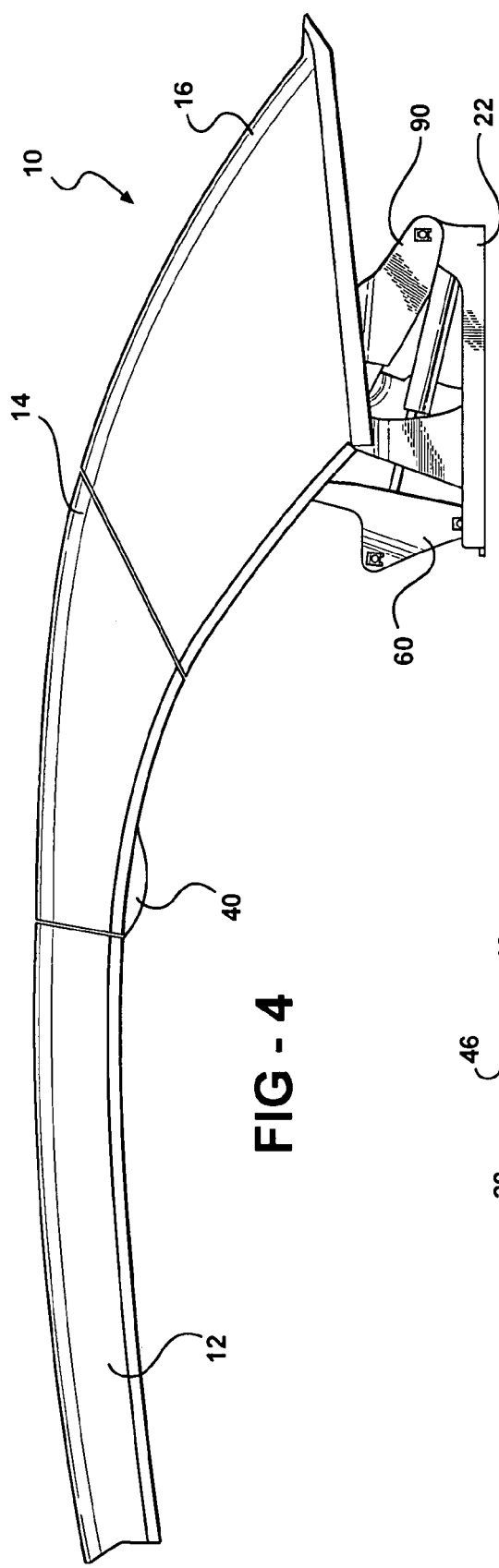
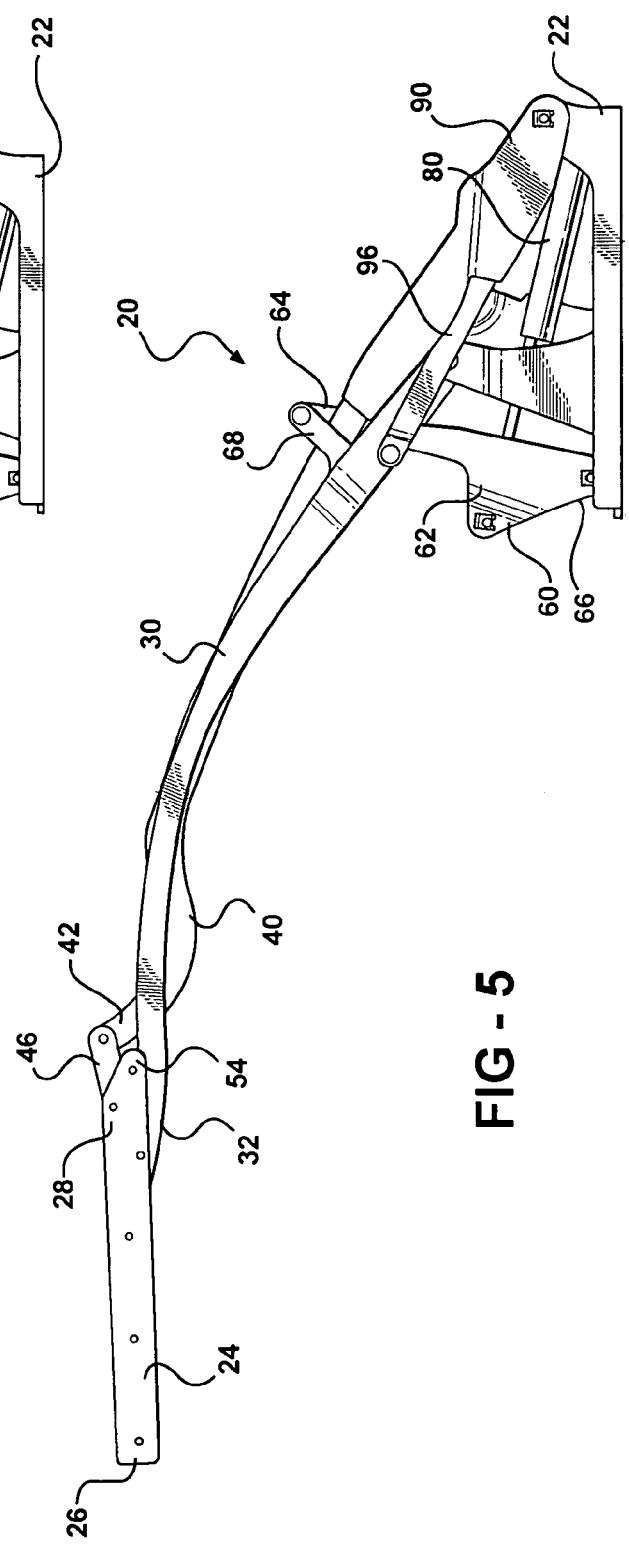
FIG - 4
FIG - 5

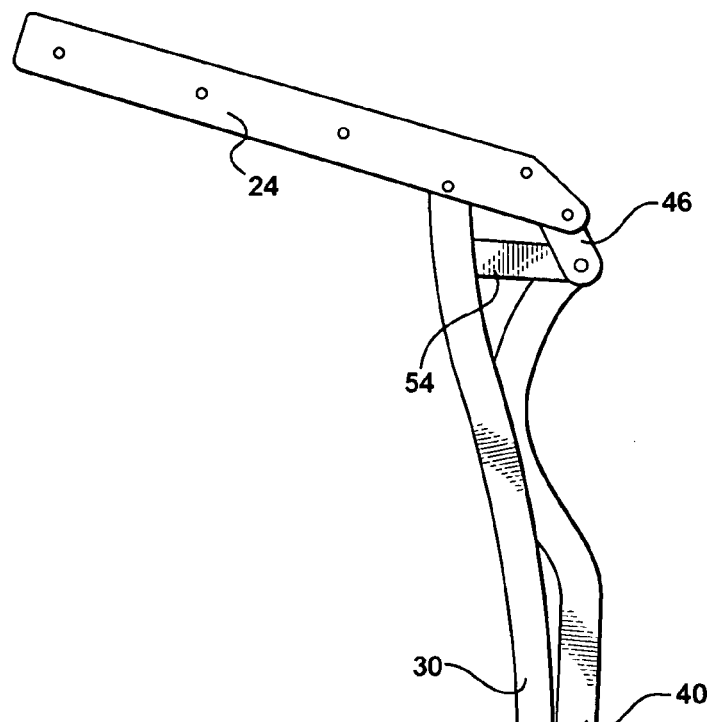
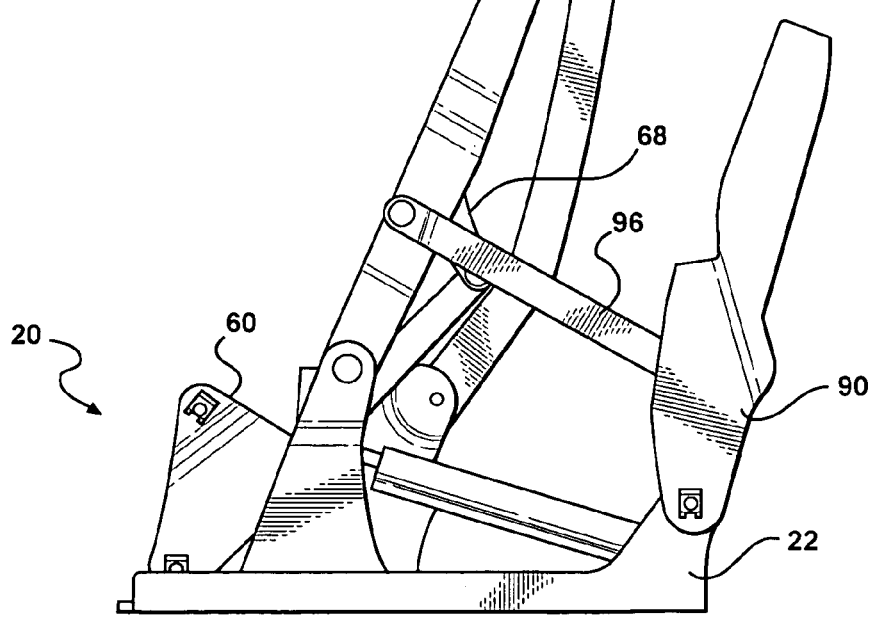
FIG - 9

RETRACTING MECHANISM FOR USE WITH BOTH HARD AND HYBRID RETRACTABLE TOPS FOR VEHICLES

REFERENCES TO RELATED APPLICATION

This application is a continuation-in-part of U.S. patent application Ser. No. 10/640,517, filed Aug. 13, 2003, now U.S. Pat. No. 7,118,161 which claims priority from U.S. Provisional Patent Application Ser. Nos. 60/445,094, filed Feb. 5, 2003 and 60/403,601, filed Aug. 14, 2002. This application also claims priority from U.S. Provisional Patent Application Ser. No. 60/536,912, filed Jan. 16, 2004, the content of all of which are incorporated herein by reference in their entirety.

FIELD OF THE INVENTION

The present invention relates generally to retractable roof structures for automobiles and, more specifically, to a structure that may form a hard or soft top for a vehicle.

BACKGROUND OF THE INVENTION

Most vehicles have rigid roof structures that permanently extend over and cover the passenger compartment. Manufacturers also provide a variety of designs that offer the vehicle operator the opportunity to partially or completely uncover the passenger compartment. Sunroofs and moonroofs are some of the simplest designs, and offer the opportunity to open a portion of the vehicle roof for increased airflow. More complicated designs allow the entire roof structure to be retracted and stored behind the passenger compartment.

Retractable roof systems generally fall into two categories. The most common type of retractable roof design is a convertible soft top or roof. These designs include an articulating structural framework with a flexible cloth or plastic outer skin. In an extended position, the front end of the articulating framework connects to a header above the vehicle windshield and the outer skin extends over the passenger compartment. When retracted, the articulating mechanism, along with the outer skin, fold into a compact shape.

While convertible soft tops offer the choice between a covered or uncovered passenger compartment, they also suffer from several disadvantages in comparison to traditional rigid roof structures. Vehicles with soft tops are typically less well sealed against the elements and are somewhat noisy. They are also less resistant to break-in attempts and have a less finished interior appearance.

Retractable soft tops also present challenges in the design of a rear window. In a rigid roof structure, the rear window design may be dictated by visibility and styling criteria. Large glass rear windows are typically used to provide an unobstructed view to the rear of the vehicle, and to give a pleasing aesthetic appearance. In retractable soft tops, the rear window is typically stored, along with the folded soft top, in the storage area of the vehicle. The least complicated and least expensive approach is to use a flexible plastic rear window. However, plastic rear windows often distort the view, may have an undesirable aesthetic appearance, and features such as heated rear windows cannot be provided. Some more complicated soft top designs use rigid glass windows. Some designs require the window to be stored separately from the folded top, thereby complicating retraction of the vehicle top. Other designs resort to complicated mechanisms to store the rigid rear window without unduly stressing the window. However, retractable soft top roof designs with rigid glass rear windows almost always use a rear window that is much smaller than desirable from a visibility and styling point of view. The reduced size of the window is dictated by retraction and packaging considerations.

The other type of retractable roof design is a retractable or folding hardtop roof system. Retractable hardtops consist of one or more rigid roof elements that are mechanically articulated such that they can be repositioned into a storage area behind the passenger compartment. Because the retractable hardtop consists of rigid sections, the system can provide a much closer approximation of a traditional rigid roof structure. In the extended position, a retractable hardtop securely covers and seals the passenger compartment, giving the appearance of a permanent roof. A retractable hardtop does a significantly better job of sealing the passenger compartment, reducing noise, and preventing break-ins. However, the retraction and storage of the hardtop presents significant mechanical challenges. Typically, when the retractable hardtop is in the retracted position, it resides in the portion of the vehicle traditionally provided for storage, such as the vehicle's trunk. While the storage space may be completely usable when the hardtop is in the extended position, most consumers prefer not to sacrifice the use of the storage position when the roof is retracted. There is generally a tradeoff between storage efficiency and mechanical complexity.

Most modern retractable hardtop designs consist of two or more articulated sections that are automatically folded or stacked in the storage area. In one design, referred to as a "clamshell" design, the roof structure is divided into a front section and a rear section. The front and rear sections are pivotally interconnected and the rear section is pivotally connected to a support structure behind the passenger compartment. Examples of clamshell type retractable hardtop designs are shown in U.S. Pat. No. 6,217,104 to Neubrand, and U.S. Pat. No. 5,785,375 to Alexander et al.

In a clamshell design, the front and rear sections may both be said to have an inner and an outer surface, with the outer surfaces cooperating to form the outer surface of the roof structure when in the extended position. When retracted, the front section folds so as to bring the inner surface of the front section towards the inner surface of the rear section. The front and rear sections are then together positioned into the storage area. Often, the trunk lid of the vehicle moves out of the way to allow the hardtop sections to move into a position in the trunk. The trunk lid is then repositioned to cover the pair of sections. In most designs, the front and rear sections both have generally convex outer surfaces and concave inner surfaces. Therefore, when the inner surfaces are folded towards one another, the concave shapes cause there to be a significant distance between the mid-portions of the folded front and rear sections. Consequently, clamshell designs do not store as compactly as some other designs. Their advantage is that they are significantly less complex than most other designs. Reduced complexity not only reduces manufacturing costs, but also improves reliability of the system. Clamshell designs also have better structural integrity than some other designs.

An alternative design, which provides improved storage efficiency, may be referred to as a "stacking" design. Again, the roof is divided into two or more sections. However, when the hardtop is retracted, the roof sections are stacked such that the inner surface of one section is adjacent to the outer surface of another section. Because each section typically has a concave inner surface and a convex outer surface, placing the inner surface of one section next to the outer surface of another results in more efficient space utilization. Examples of stacking retractable hardtop designs are shown in U.S. Pat. No. 6,336,673 to Rothe et al., U.S. Pat. No. 6,318,793 to Rapin et al., U.S. Pat. No. 6,053,560 to Rothe, and U.S. Pat. No. 5,979,970 to Rothe et al. As will be clear to those of skill in the art, stacking designs require significantly more complex articulation mechanisms than clamshell designs. This increased complexity leads to increased costs, reduced reliability, and reduced structural integrity.

There are retractable roof designs that combine the attributes of retractable hard tops and retractable soft tops. An example is shown in U.S. Pat. No. 6,422,637 to Mac-Farland. In this design, the retractable roof structure includes three rigid roof sections and a flexible outer skin that is stretched over and covers the roof sections when the roof is in the closed or extended position. The flexible outer skin seals the roof, with the rigid sections defining the structure and shape of the roof. The Mac Farland design has a complicated folding design such that it does not significantly reduce the cost, complexity, or packaging requirements as compared to a retractable hard top design.

In light of the above, there remains a need for retractable roof designs that offer an improved compromise between cost, mechanical complexity, space efficiency, and rear window design.

SUMMARY OF THE INVENTION

According to one aspect of the invention, a retractable top system provides either a retractable hard top or a retractable soft top during manufacturing of a plurality of vehicles, wherein the vehicles have a substantially common body structure defining a windshield, a storage area and a passenger compartment therebetween. The system includes a retractable soft top version, a retractable hard top version, and a linkage.

The soft top version is movable between an extended position to define a roof over the passenger compartment and a retracted position wherein at least a portion of the soft top version is disposed in the storage area. The soft top version includes a rear section having opposite forward and rearward edges. The rear section has opposite inner and outer surfaces. The rear section has opposite side edges. The inner surface faces the passenger compartment when the soft top version is in the extended position. The rear section is a rigid panel extending between the side edges and between the forward and rearward edges. A forward section is disposed forwardly of the rear section when the top is in the extended position. The forward section has opposite inner and outer surfaces. The inner surface faces the passenger compartment when the soft top version is in the extended position. A flexible roof membrane covers at least the outer surface of the forward section when the soft top version is in the extended position.

The retractable hard top version is movable between an extended position to define a roof over the passenger compartment and a retracted position wherein at least a portion of the hard top version is disposed in the storage area. The hard top version includes a plurality of roof sections having at least a forward section and a rearward section. Each of the roof sections has opposite forward and rearward edges. Each of the roof sections has a pair of opposite side edges extending between the forward and rearward edges. Each roof section is a rigid panel extending between the respective forward and rearward edges and side edges.

The hardtop version and soft top version have substantially the same linkage for articulating the top versions between the extended and retracted positions.

BRIEF DESCRIPTION OF THE DRAWINGS

Advantages of the present invention will be readily appreciated as the same becomes better understood by reference to the following detailed description when considered in connection with the accompanying drawings, wherein:

FIG. 4 is a side elevational view of the top in the extended position;

FIG. 5 is a side elevational view of the retracting mechanism in the extended position;

FIGS. 7, 9, 11, and 13 are side elevational views of the retracting mechanism corresponding to the sequence shown in FIGS. 6, 8, 10, and 12, respectively, as the top moves between the extended position and the retracted position;

DETAILED DESCRIPTION OF THE PREFERRED EMBODIMENTS

Figure 1:
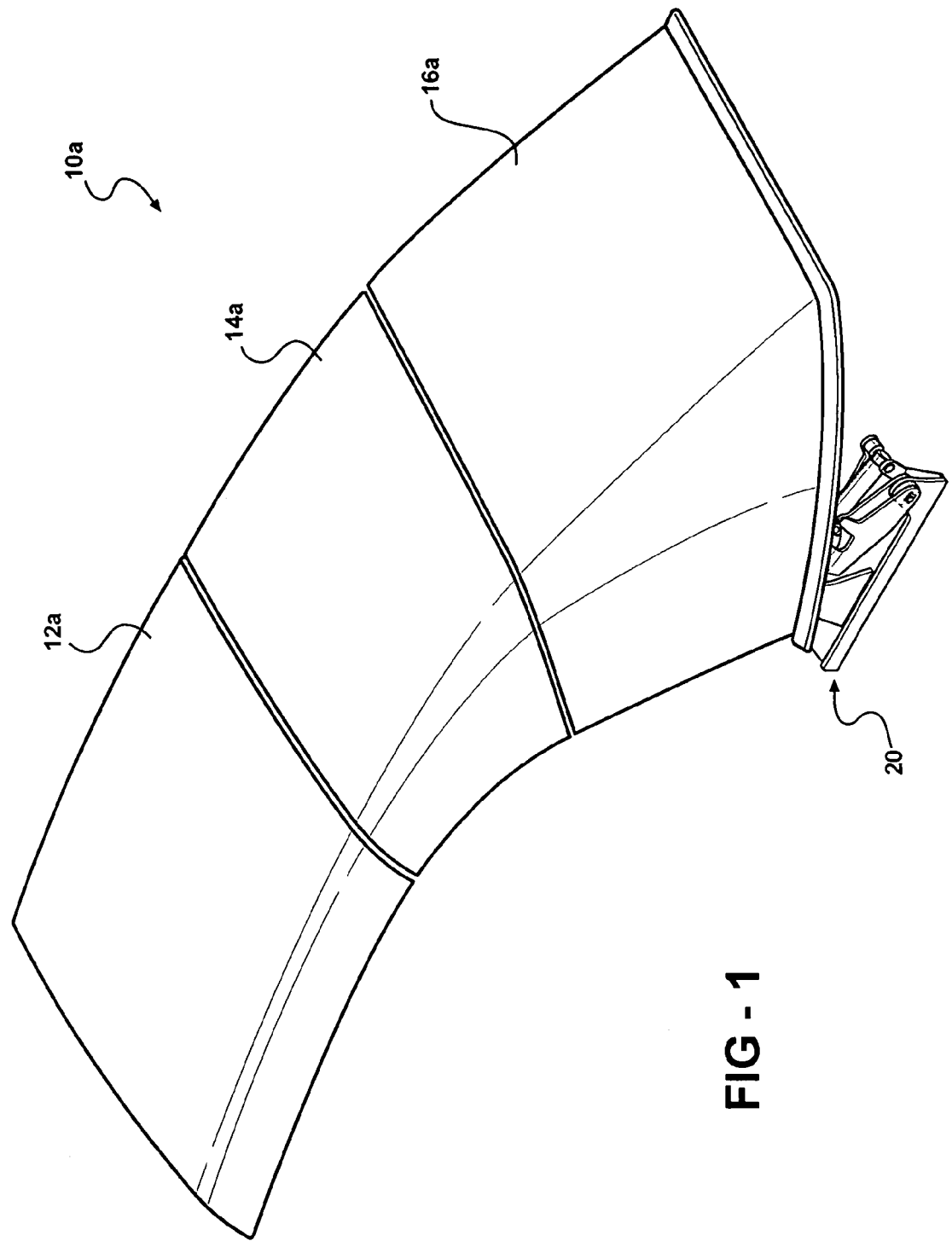
FIG. 1 is a top perspective view to a retractable hard top according to the invention with the top shown in the extended position.
Figure 2:
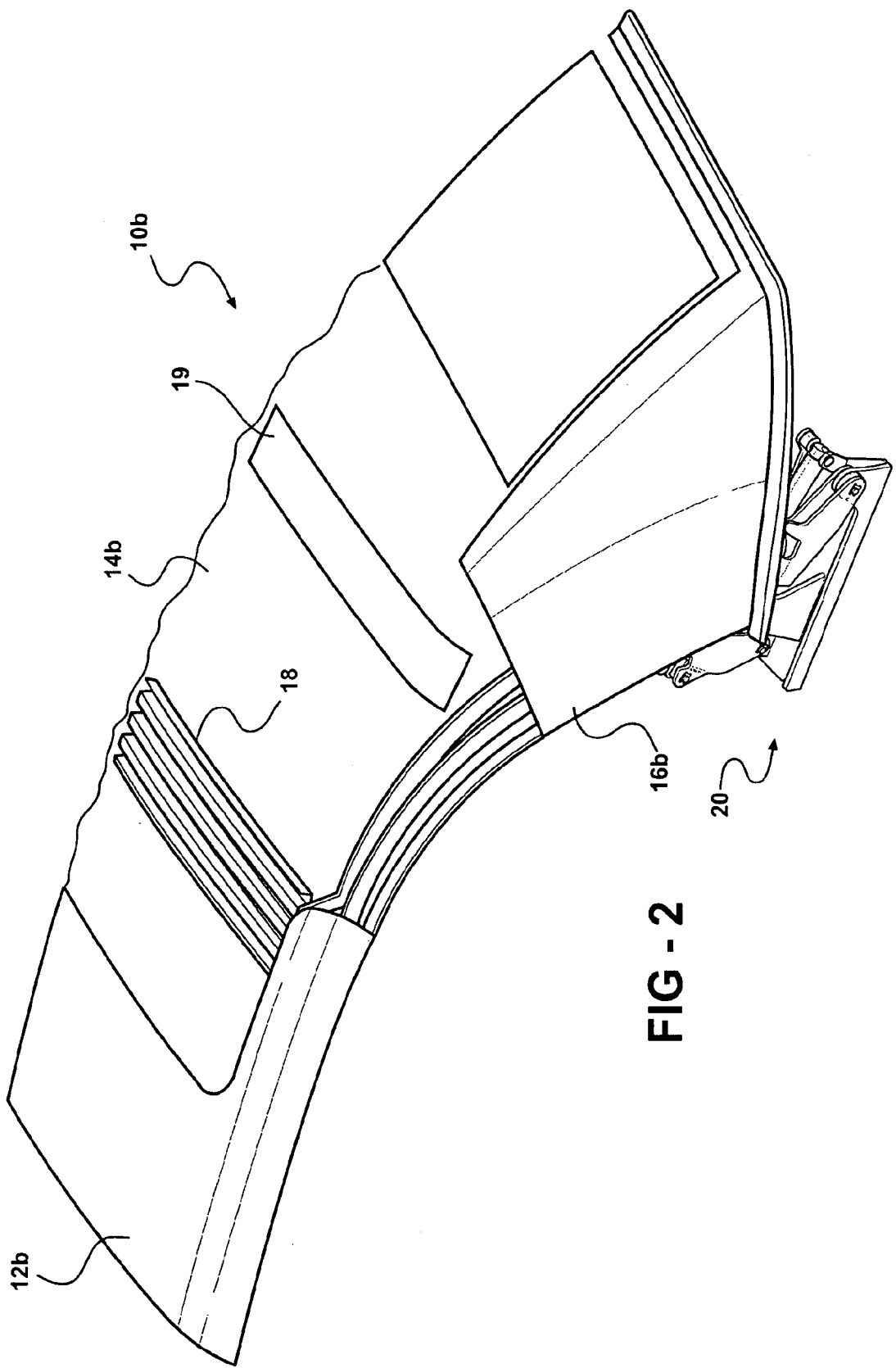
FIG. 2 is a top perspective view to a retractable hybrid hard and soft top according to the invention with the top shown in the extended position.
Figure 3:
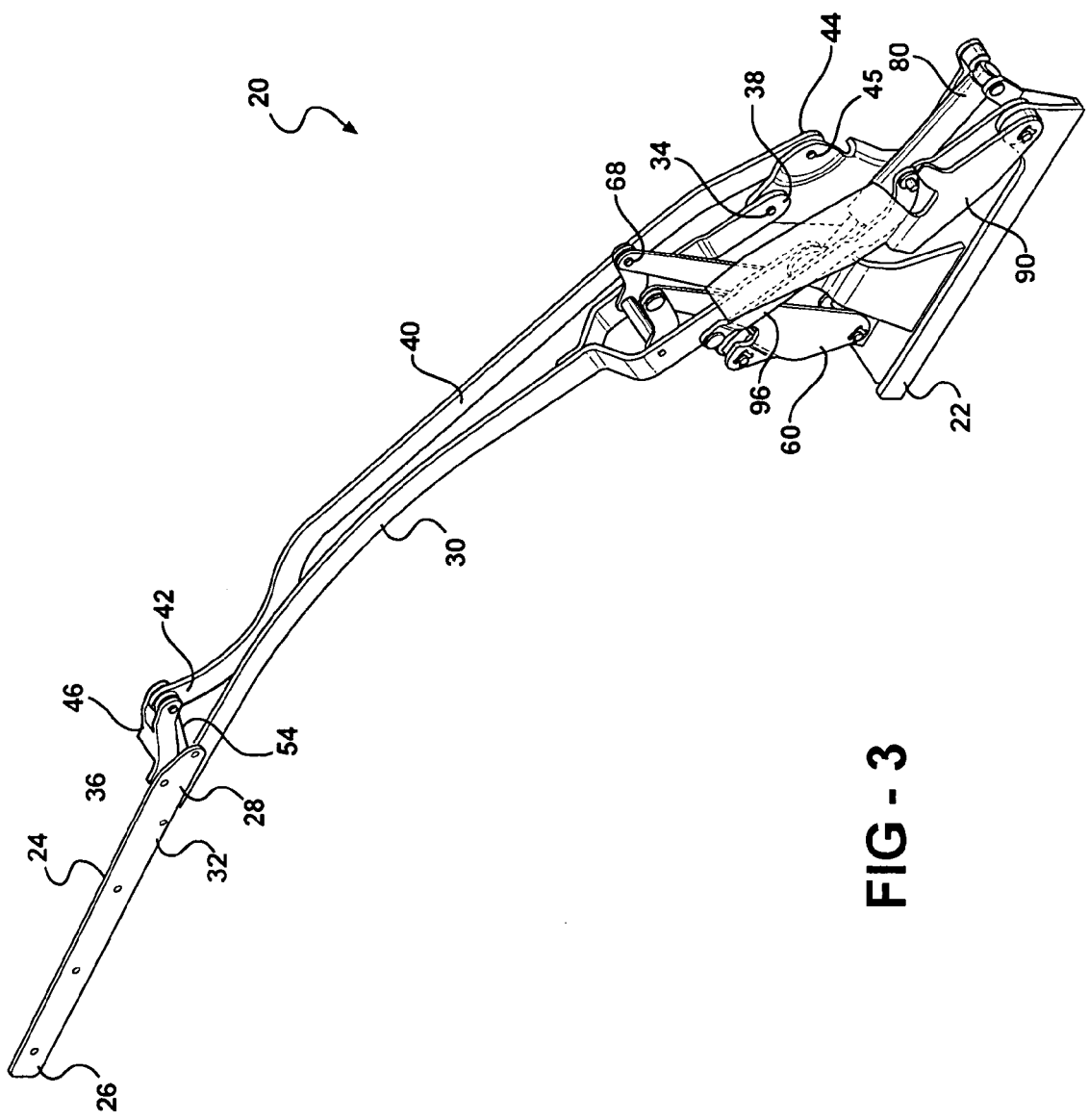
FIG. 3 is a top perspective view of a retracting mechanism for moving the hard top of FIG. 1 and the hybrid top of FIG. 2 between an extended position, a retracted position, and among a plurality of intermediate positions therebetween.
Figure 6:
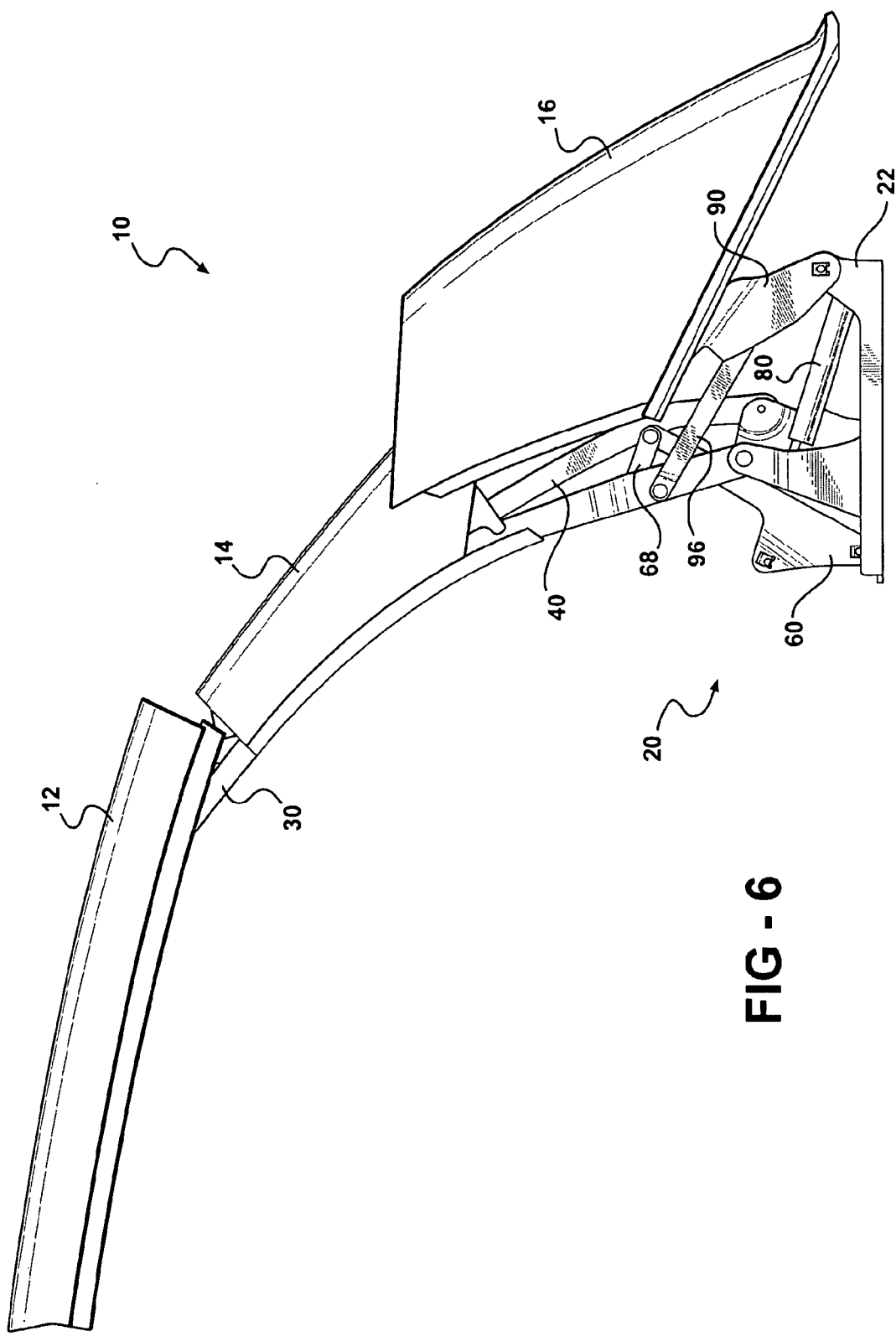
FIGS. 6, 8, 10, and 12 are side elevational views of the top as it moves sequentially between the extended position and the retracted position.
Figure 7:
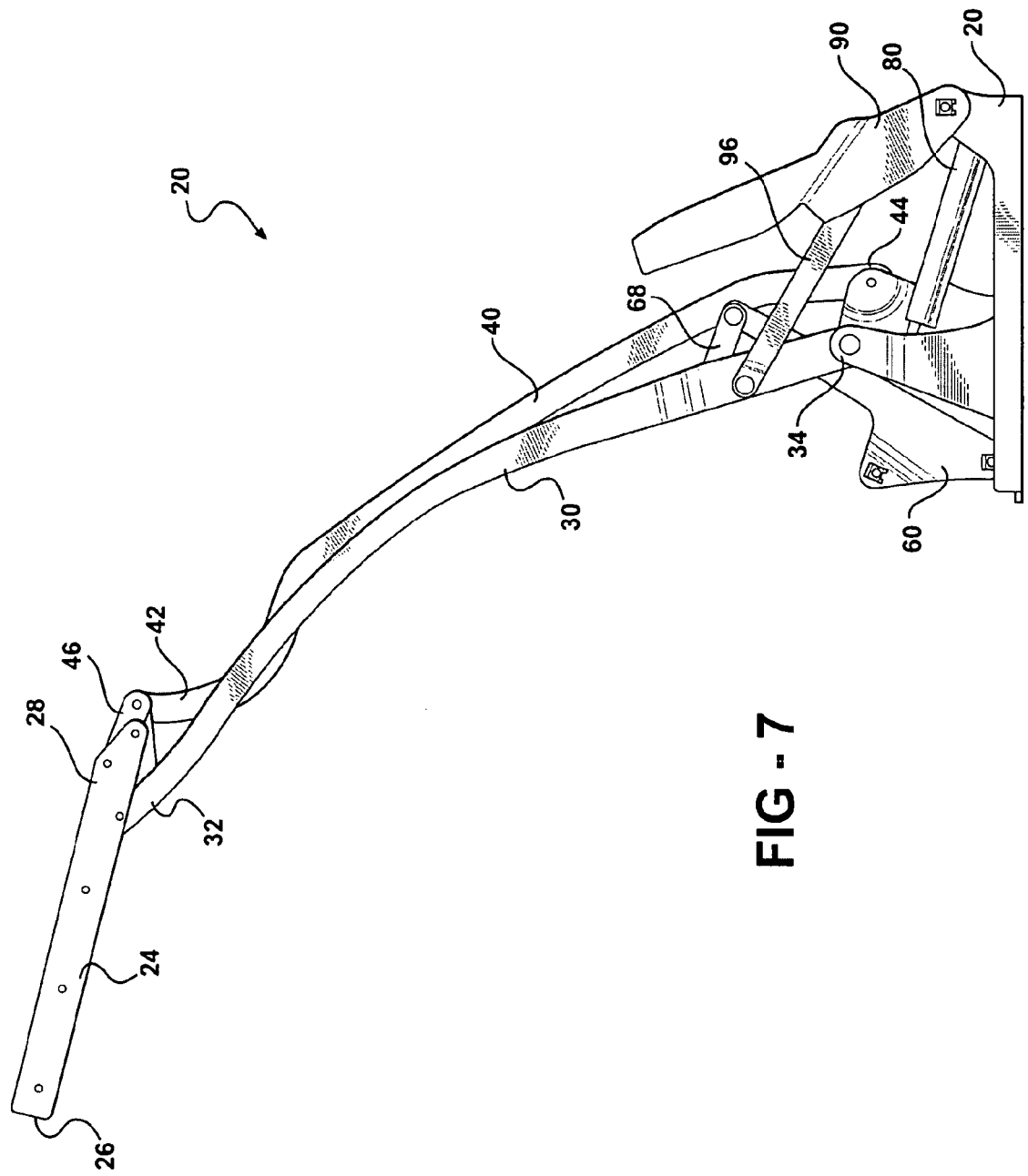
Figure 8:
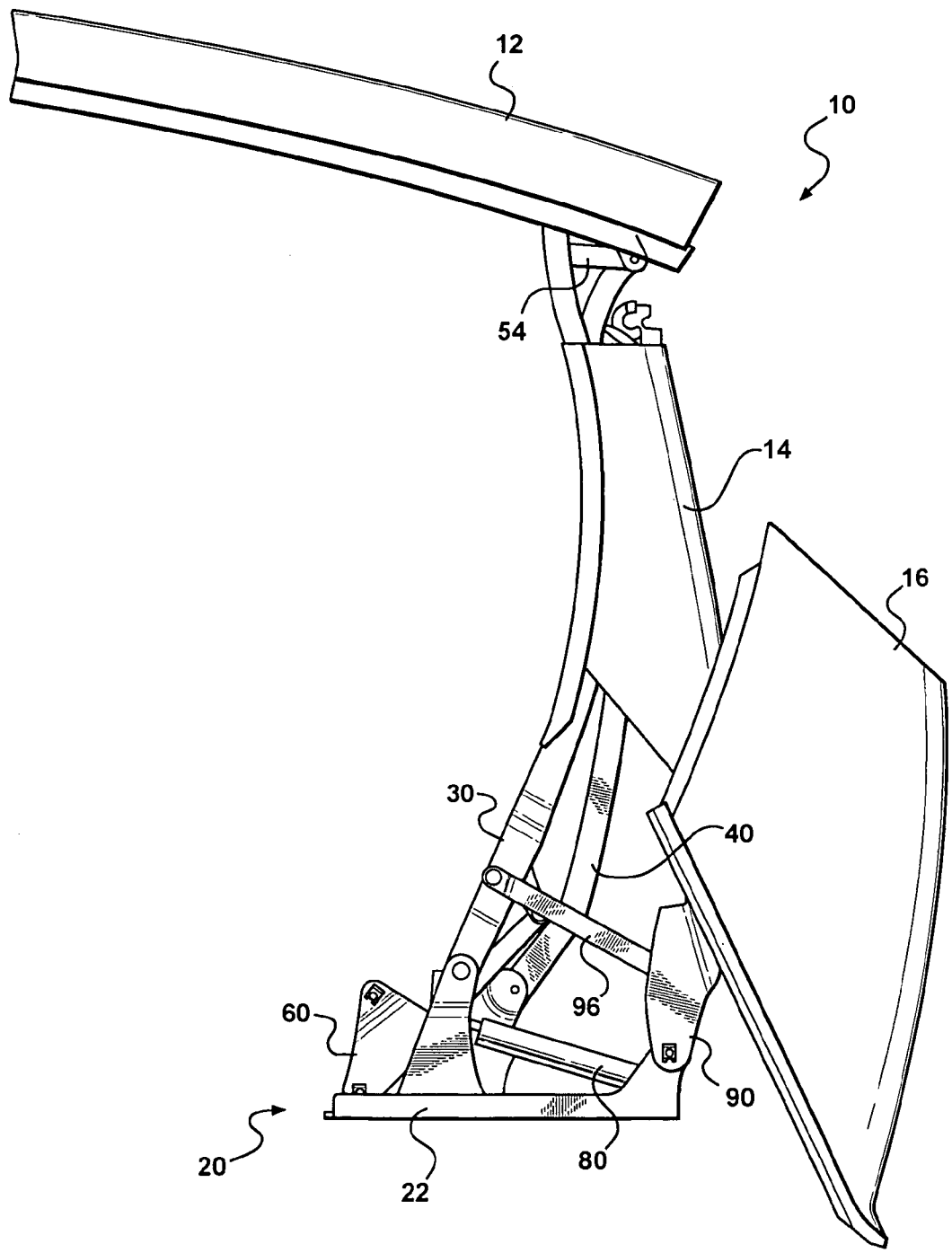
Figure 10:
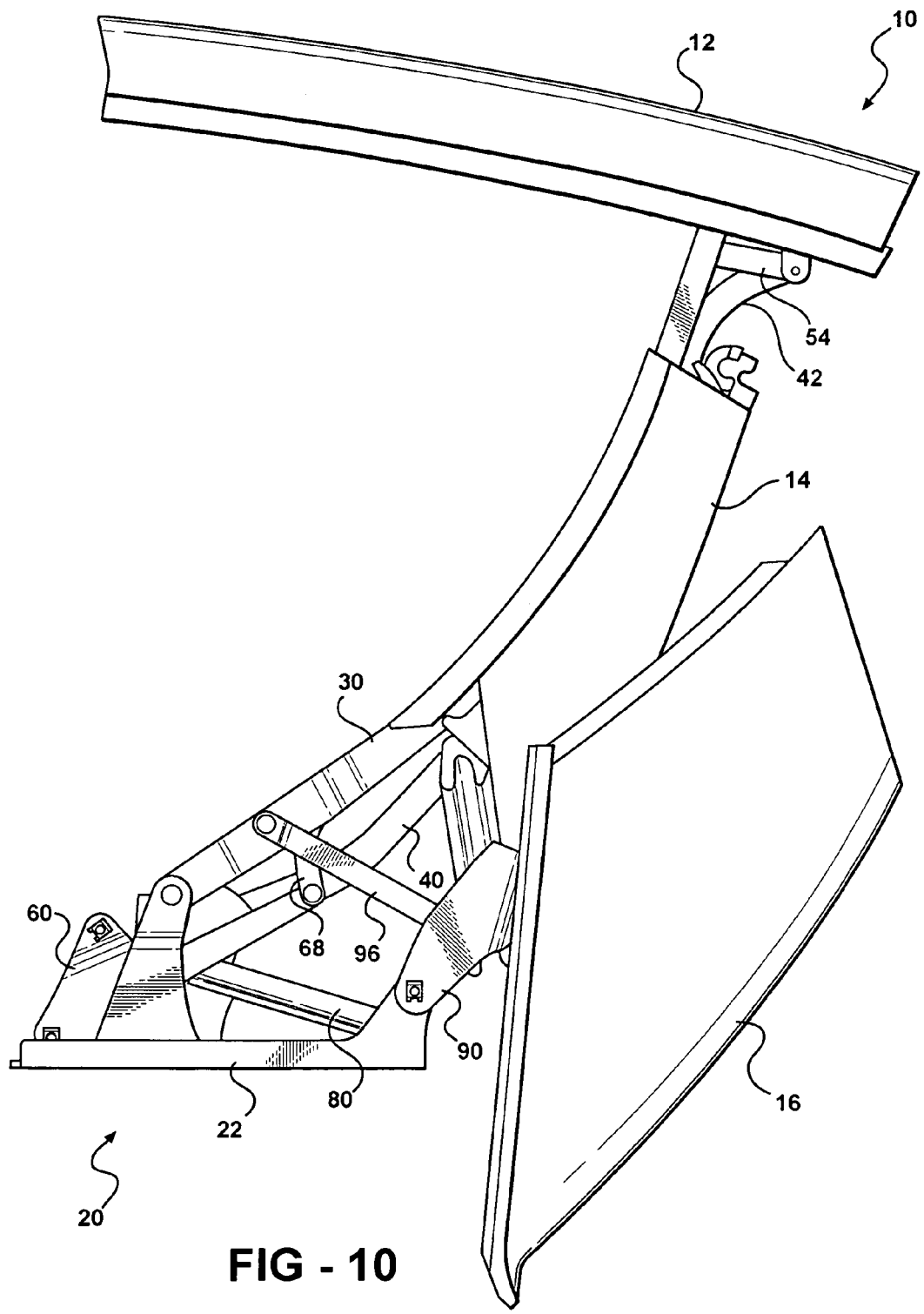
Figure 11:
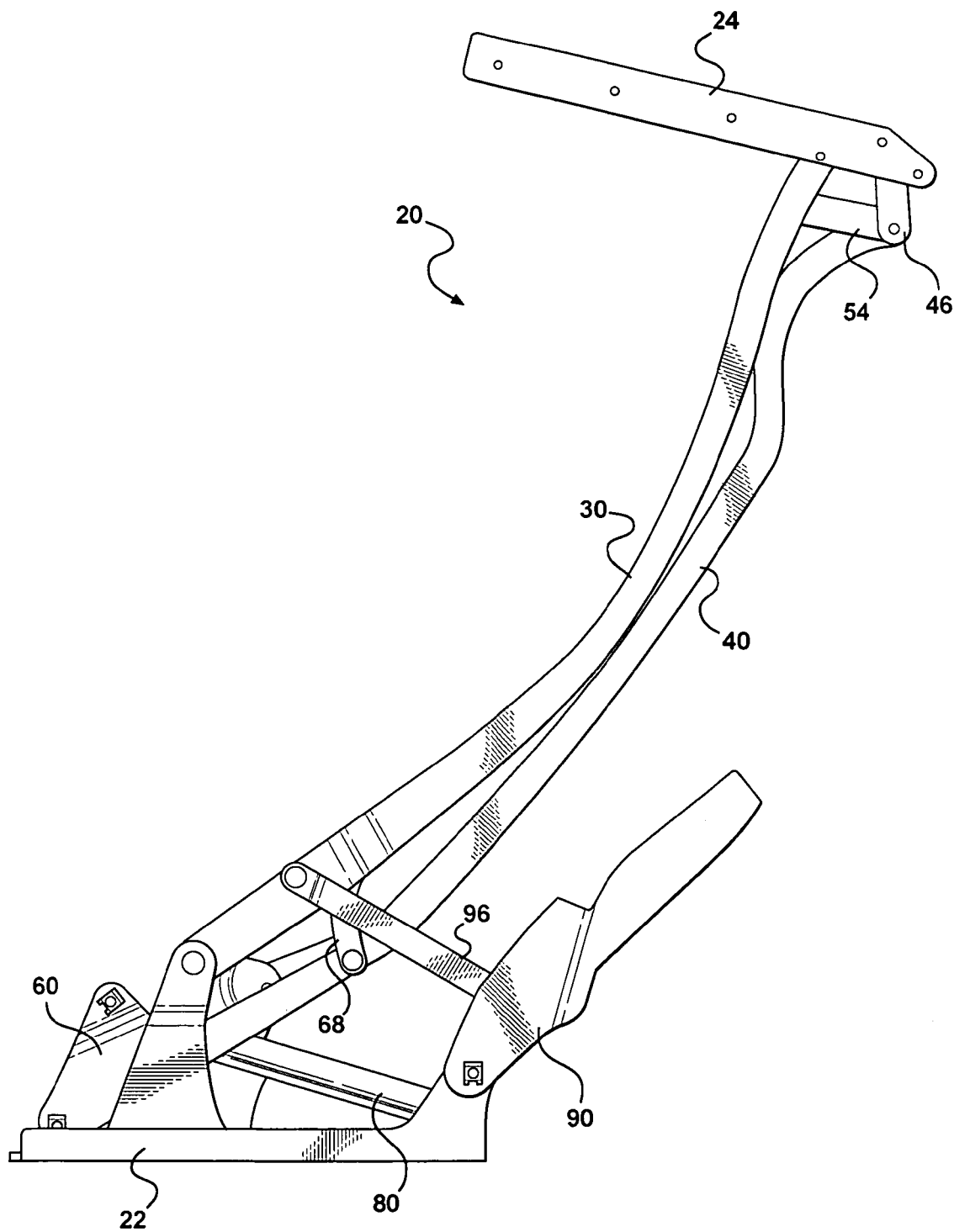
Figure 12:
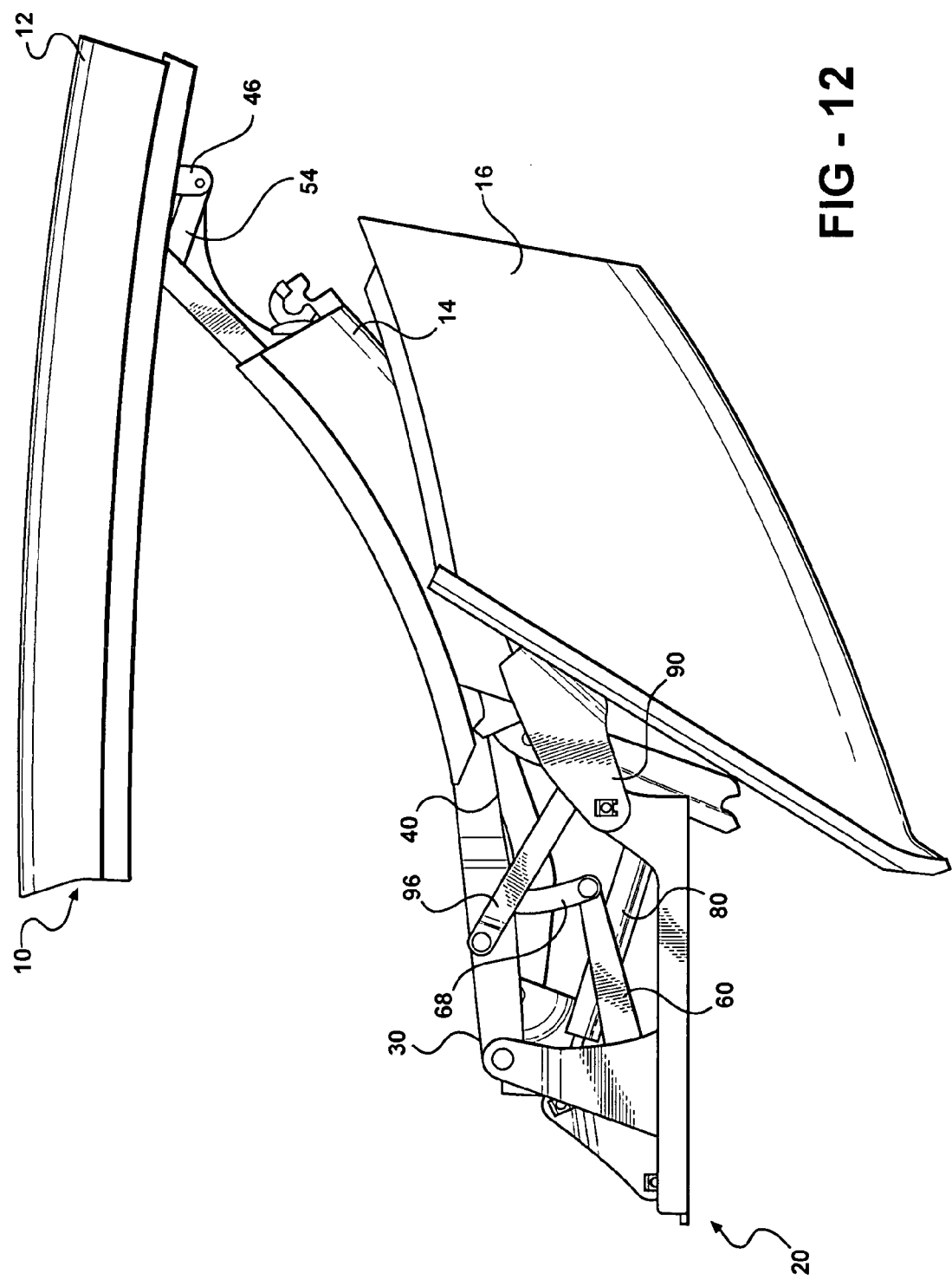
Figure 13:
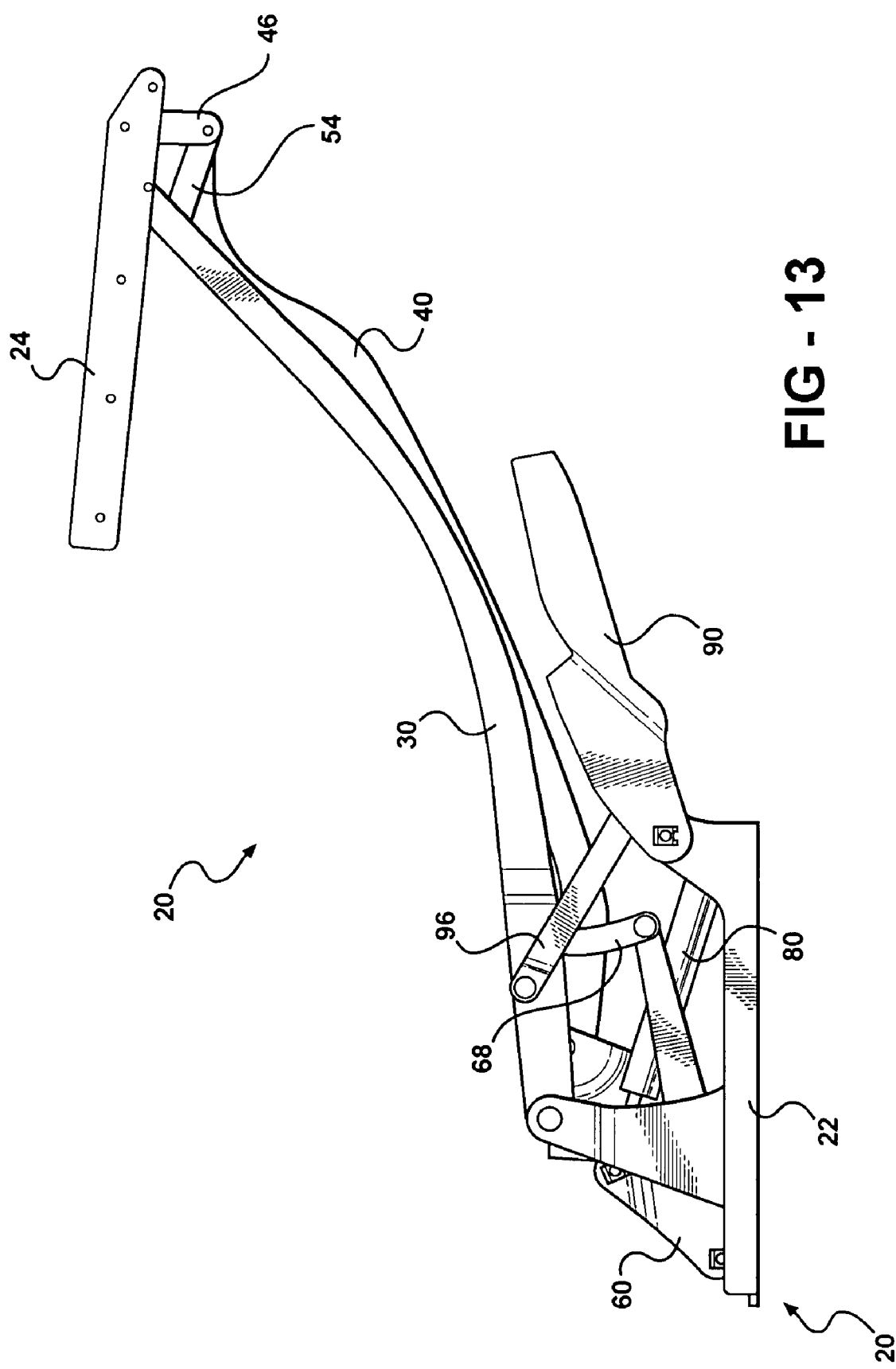

Referring to the figures, two embodiments of a retractable convertible top assembly for an automotive vehicle according to the present invention are generally indicated at 10a and 10b in FIGS. 1 through 24. The first embodiment in FIG. 1 is a retractable hard top 10a, which includes rigid front 12a, middle 14a and rear 16a sections. The second embodiment in FIG. 2 is a retractable hybrid top 10b, which includes a combination of rigid front 12b and rear 16b sections and an open middle section 14b. A soft, membranous cover extends over at least the open middle section 14b and an outer surface of the front section 12b. Preferably, the cover extends over all of the sections 12b, 14b, 16b. A single retracting mechanism design is utilized for both the hard top 10a and the hybrid top 10b, which allows selective movement of the tops between a closed position and an open position. The retracting mechanism, generally indicated at 20 in the figures, is described in detail below, wherein the hard top 10a and hybrid top 10b are referred to as a retractable top 10. The retracting mechanism 20 includes substantially symmetrically opposite sides disposed about a longitudinal centerline of the vehicle. For descriptive purposes, only one side of the retracting mechanism is shown in the figures. The front, middle and rear sections of the retractable top 10 are hereafter generally indicated at 12, 14 and 16, respectively. Each of the front 12, middle 14 and rear 16 sections extends transversely between the opposite sides of the retracting mechanism 20. For the hybrid top 10b, the retracting mechanism 20 preferably includes first 18 and second 19 cross members or bows to support the cover between the opposite sides of the retracting mechanism 20. It should be appreciated that any number of bows may be utilized to properly support the cover between the opposite sides of the retracting mechanism 20.

The retracting mechanism 20 includes a base bracket 22 for fixedly securing the retracting mechanism 20 to the vehicle. The retracting mechanism 20 also includes a side member 24 extending in a generally fore and aft direction in the vehicle between a front end 26 and an opposite rear end 28. The front section 12 of the top 10 is fixedly secured to the side member 24. Optionally, the front section 12 and the side member 24 are integrally formed. For the hybrid top 10b, the first bow 18 is supported by the side member 24 to support the membrane covering. Alternatively, the first bow 18 is integrally formed with one or both of the side member 24 and front section 12b of the hybrid top 10b.

A center link 30 extends between a top or first end 32 and an opposite bottom or second end 34. A pivot pin 36 pivotally interconnects the first end 32 of the center link 30 and the rear end 28 of the side member 24. A pivot pin 38 pivotally interconnects the second end 34 of the center link 30 to the base bracket 22. The middle section 14a of the top 10a is fixedly secured to the center link 30. For the hybrid top 10b, the middle section comprises the second bow 19, which is supported by the center link 30. The second bow 19 may be supported by the center link 30 in a variety of ways. For example, the second bow 19 may be articulated, in a variety of ways, to the center link 30 or may be fixedly attached thereto. A balance link 40 extends between opposite top 42 and bottom 44 ends. Optionally, the second bow 19 is supported by the balance link 40 instead of the center link 30. Either bow may be rigid or flexibly attached, and may be extruded, molded, stamped, or formed in any other way. Additional or fewer bows may also be used.

Figure 20:
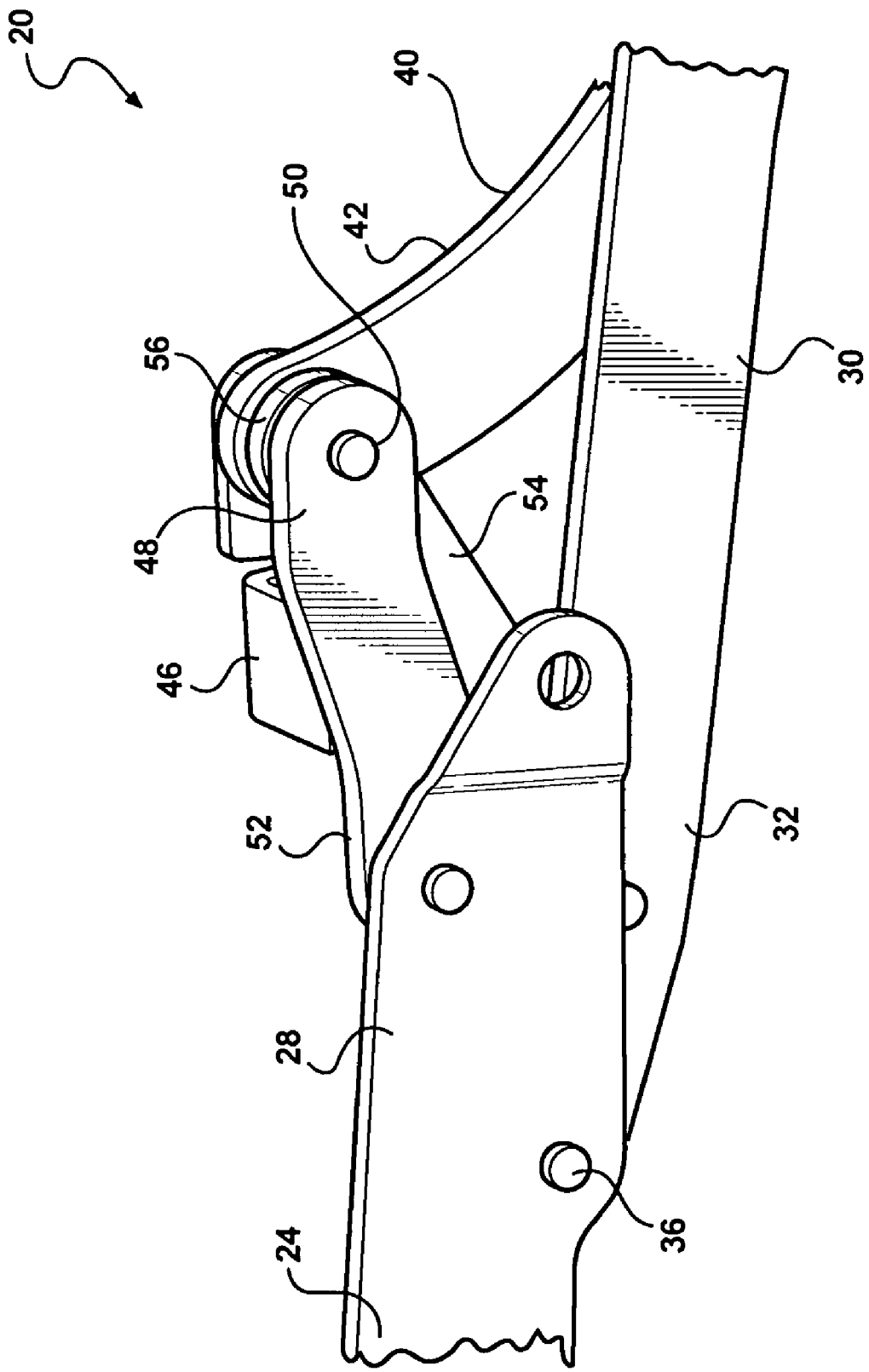
FIG. 20 is a perspective view of articulating links of the retracting mechanism.
Figure 21:
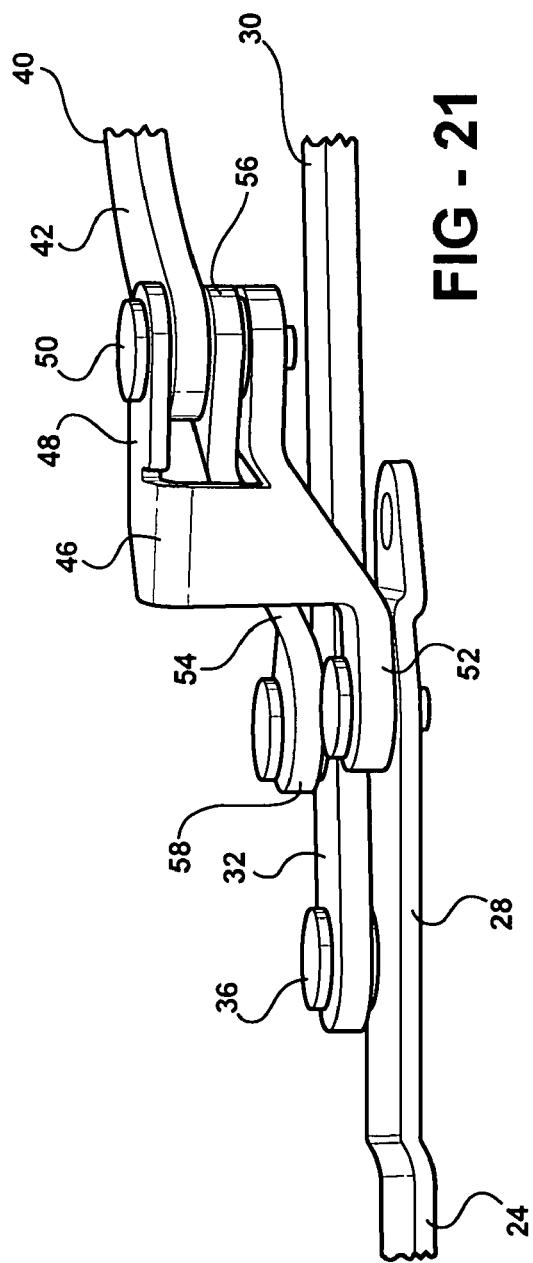
FIG. 21 is a top view of the articulating links of FIG. 20.
Figure 22:
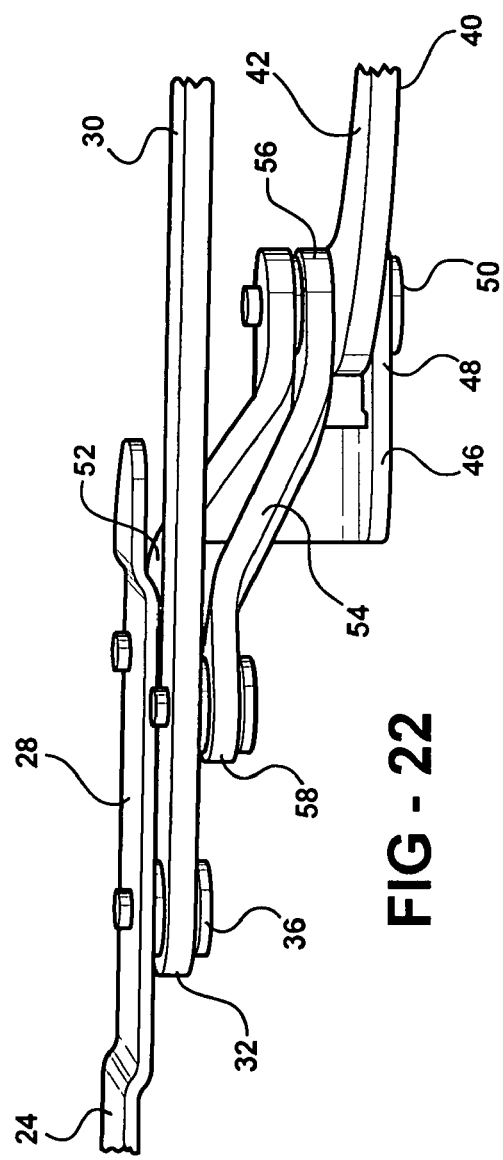
FIG. 22 is a bottom view of the articulating links of FIG. 20.
Figure 23:
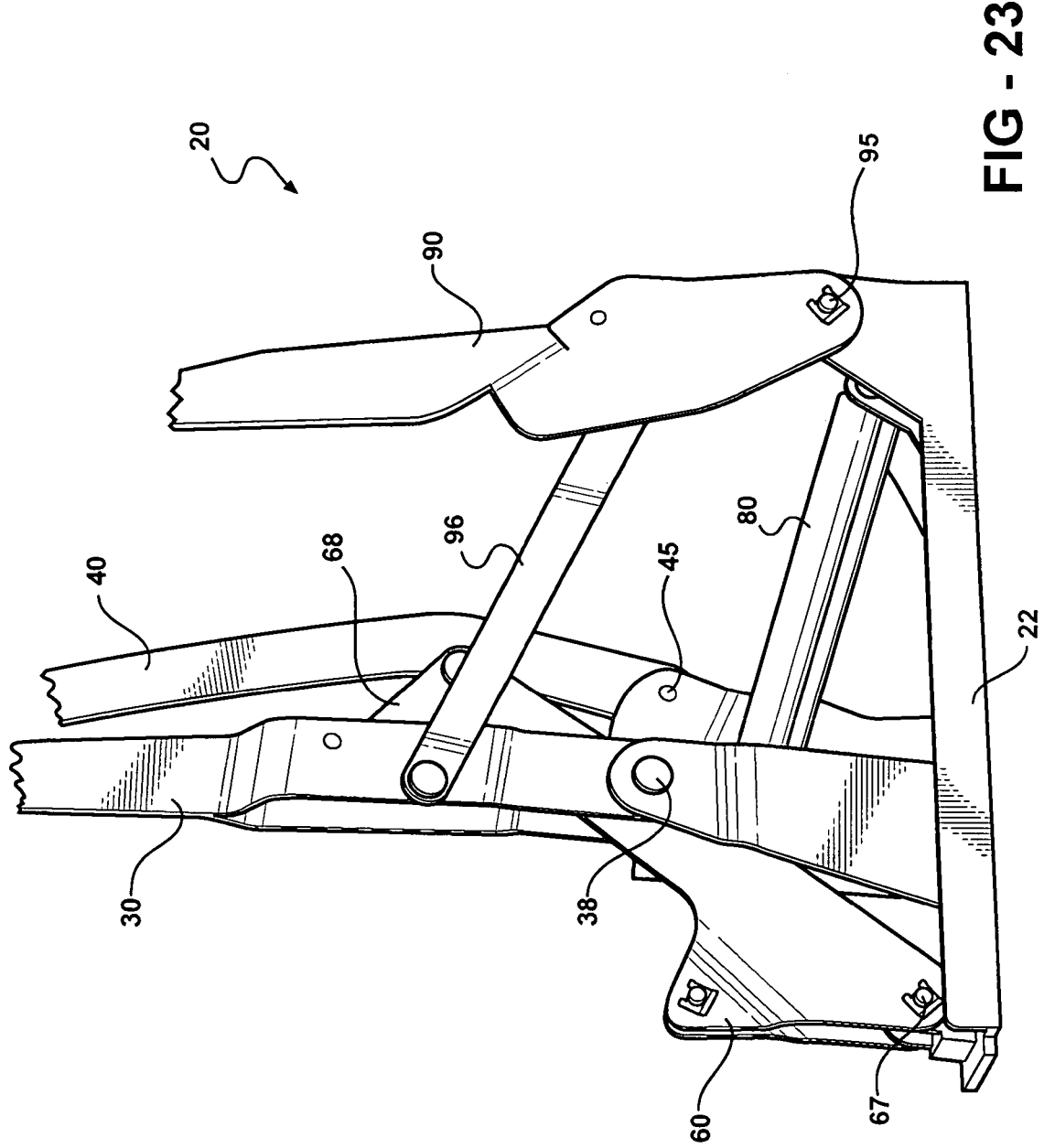
FIG. 23 is an enlarged side elevational view of the retracting mechanism in an intermediate position.
Figure 24:
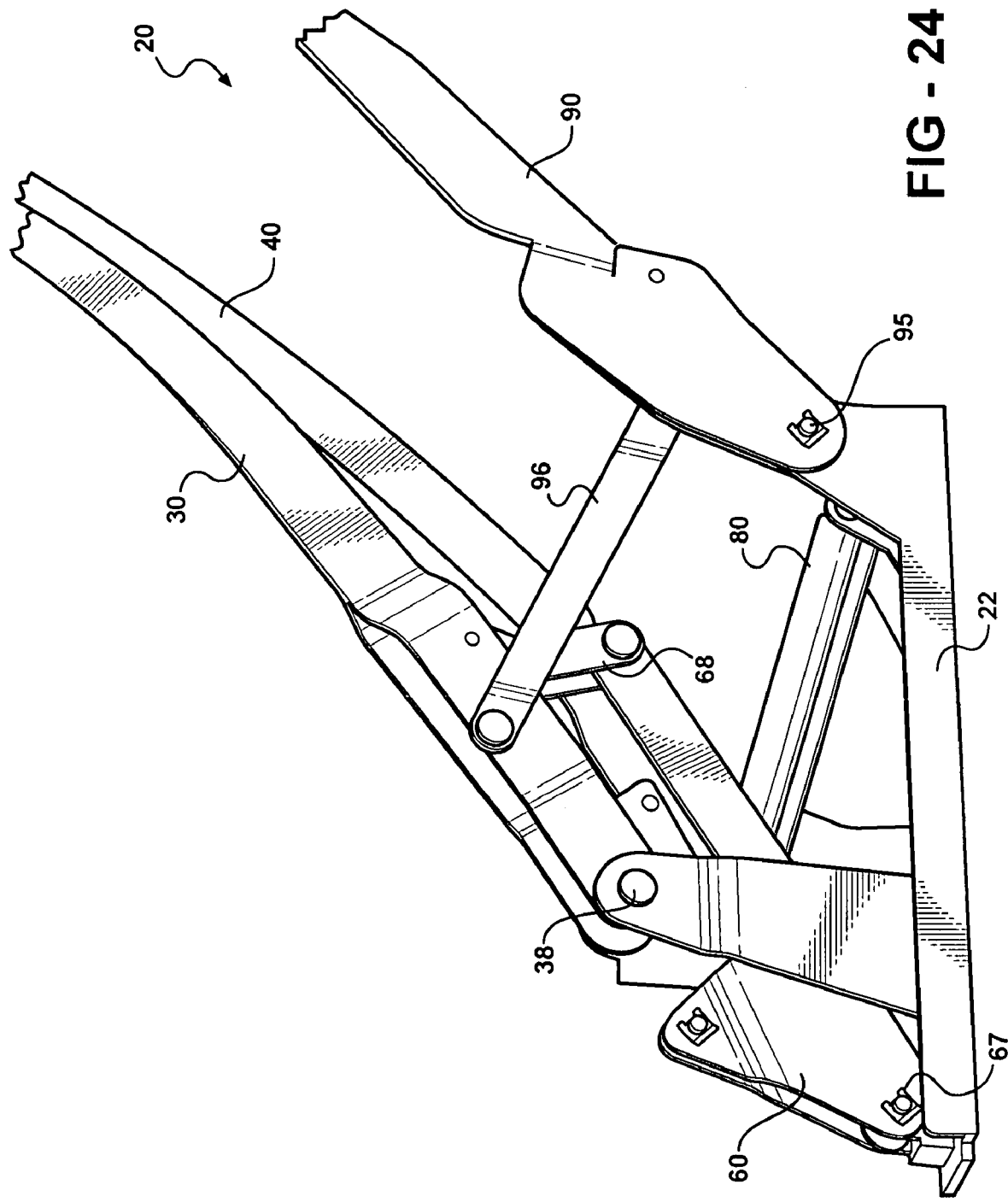
FIG. 24 is an enlarged side elevational view of the retracting mechanism in a position closer to the retracted position relative to that shown in FIG. 23.

A pivot pin 45 pivotally interconnects the bottom end 44 of the balance link 40 to the base bracket 22. The top end 42 is operatively coupled to both the rear end 28 of the side member 24 and the first end 32 of the center link 30. As best shown in FIGS. 20 through 22, a first articulating link 46 extends between one end 48 pivotally interconnected by a pivot pin 50 to the balance link 40 adjacent the top end 42 and an opposite end 52 pivotally interconnected to the rear end 28 of the side member 24. A second articulating link 54 extends between one end 56 pivotally coupled to the pivot pin 50 and an opposite end 58 pivotally coupled to the center link 30 adjacent the first end 32.

As best shown in FIGS. 16 through 19, the retracting mechanism 20 includes a knee link 60. The knee link 60 includes an intermediate portion 62 extending between an upper end 64 and a lower end 66. A pivot pin 67 pivotally interconnects the lower end 66 of the knee link 60 to the base bracket 22. A swing arm 68 extends between one end 70 pivotally coupled to the upper end 64 of the knee link 60 and an opposite end 72. A pivot pin 73 pivotally interconnects the opposite end 72 of the swing arm 68 to the center link 30 adjacent the second end 34. A cylinder-type actuator 80 extends between a fixed end 82 pivotally coupled to the base bracket 22 and a mobile end 84 pivotally coupled to the intermediate portion 62 of the knee link 60. It should be appreciated that any suitable actuator may be utilized, as known by those having ordinary skill in the art.

Figure 16:
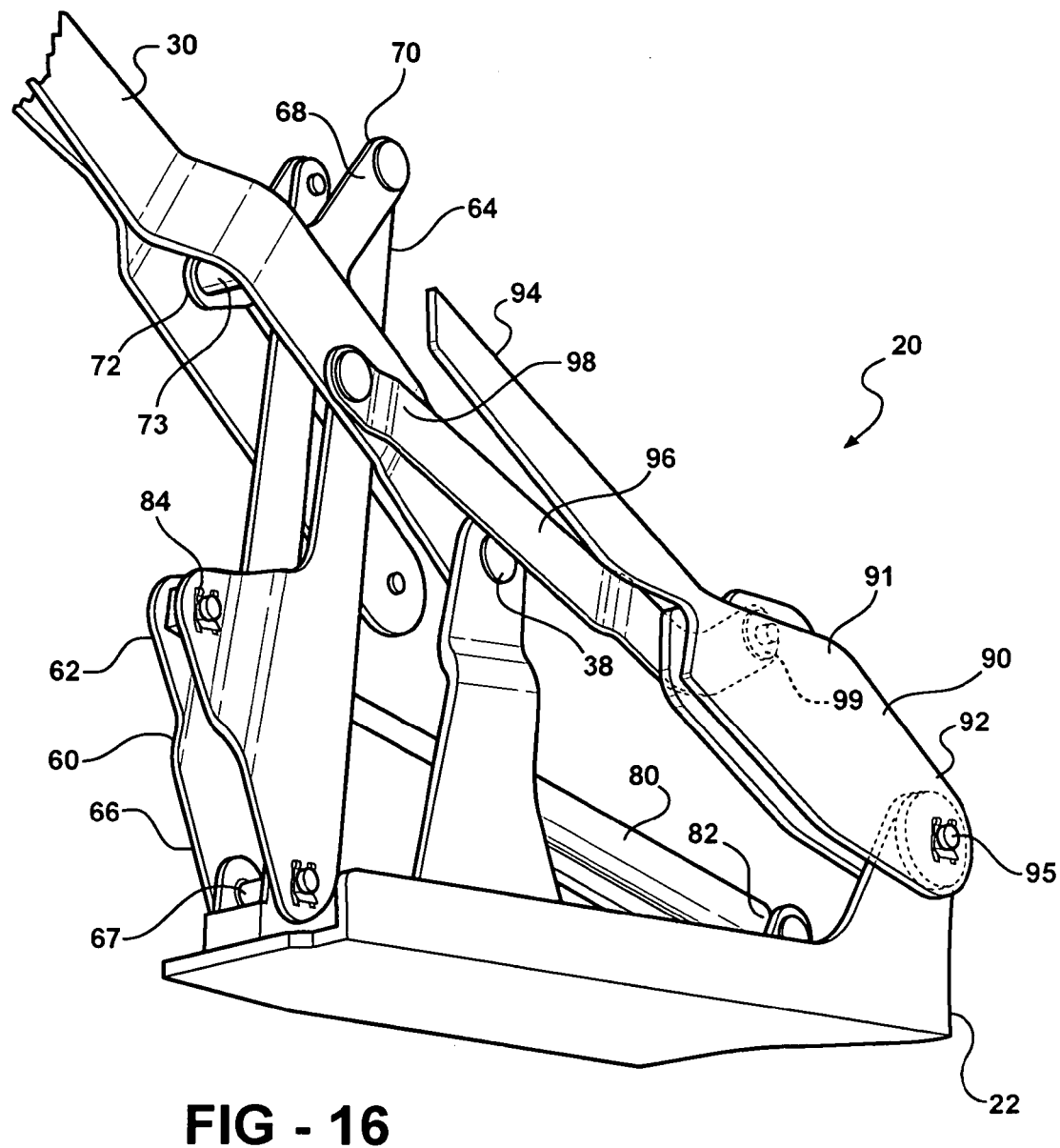
FIG. 16 is an enlarged bottom elevational view of the retracting mechanism.
Figure 17:
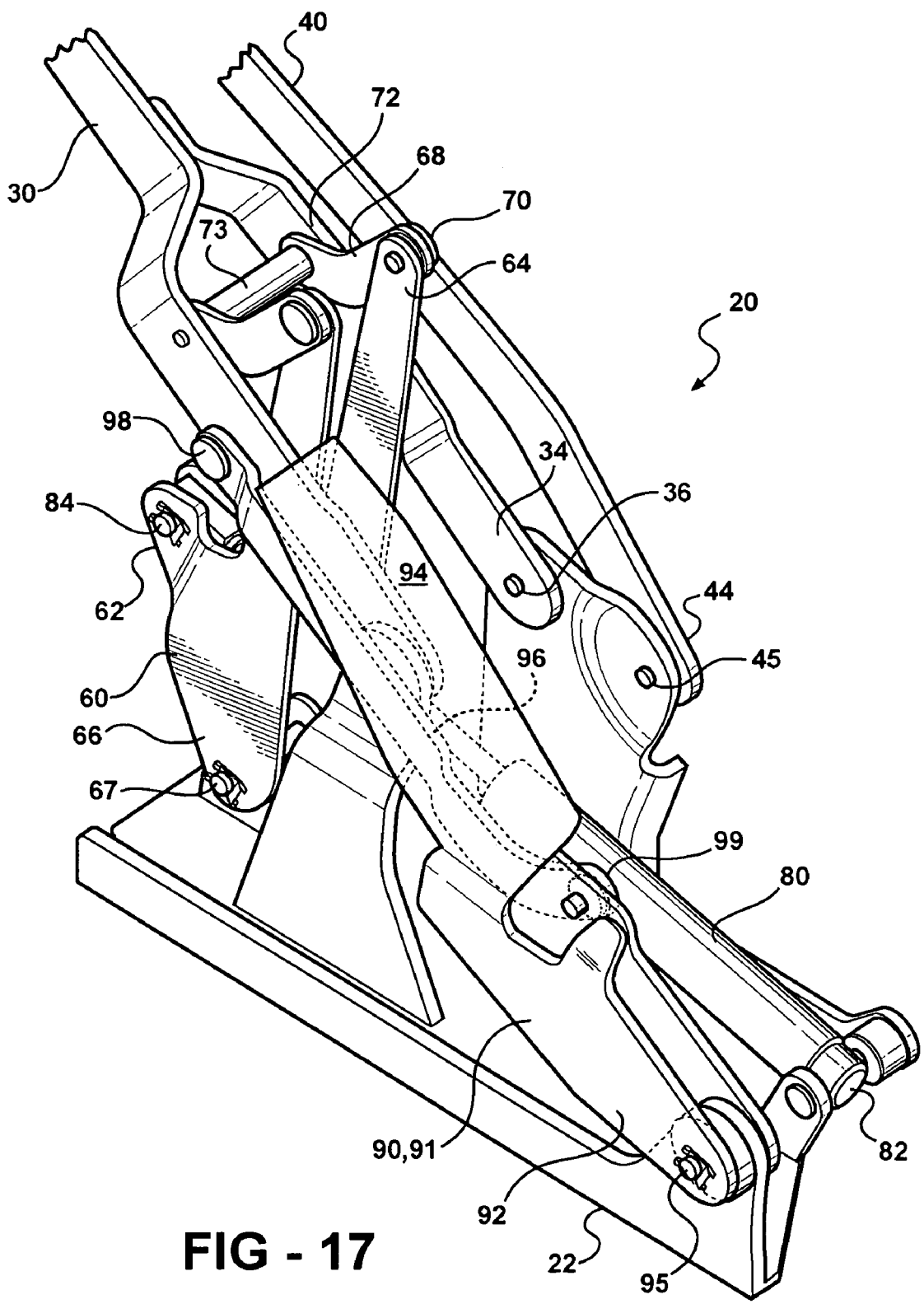
FIG. 17 is an enlarged top elevational view of the retracting mechanism.
Figure 18:
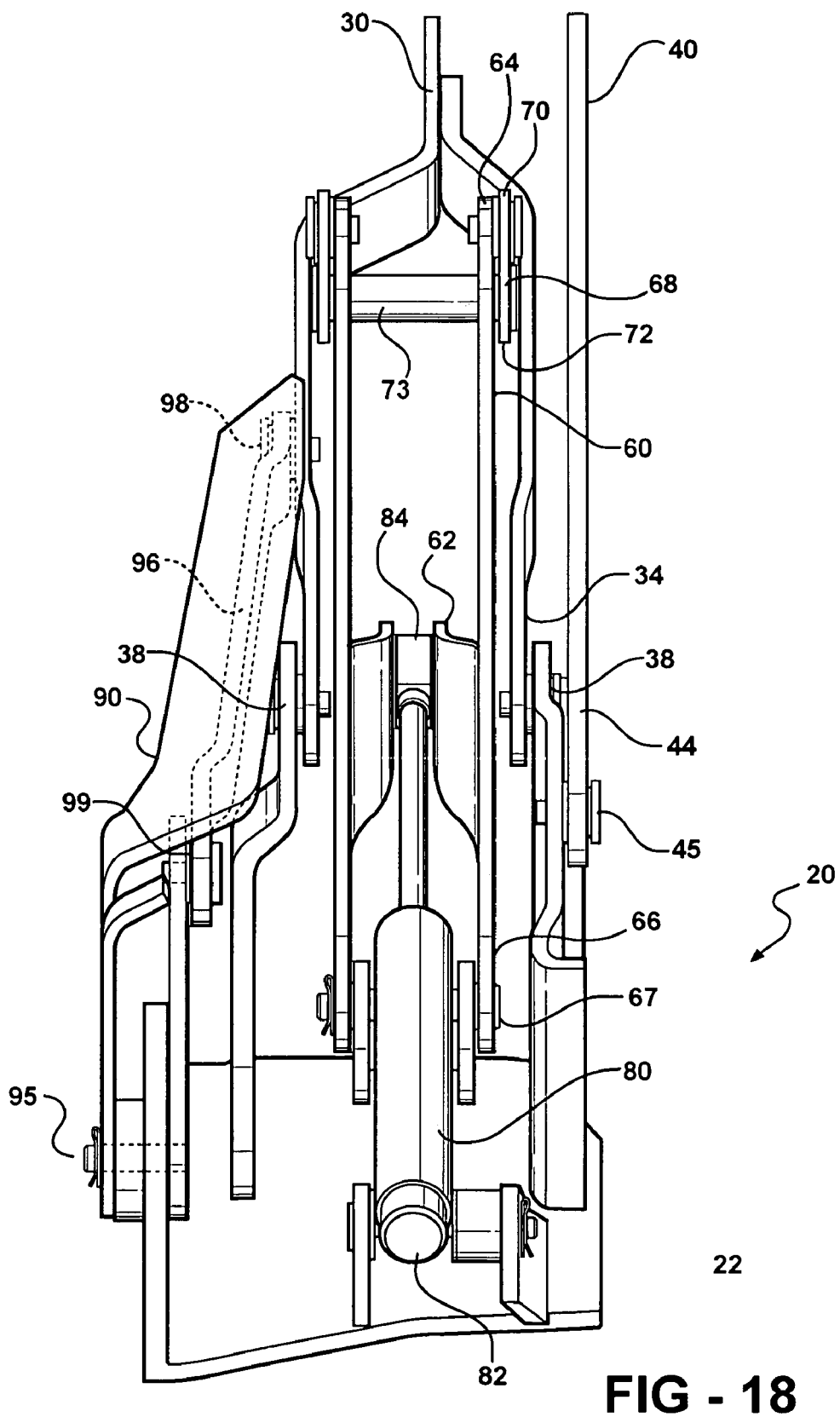
FIG. 18 is a rear view of the retracting mechanism.
Figure 19:
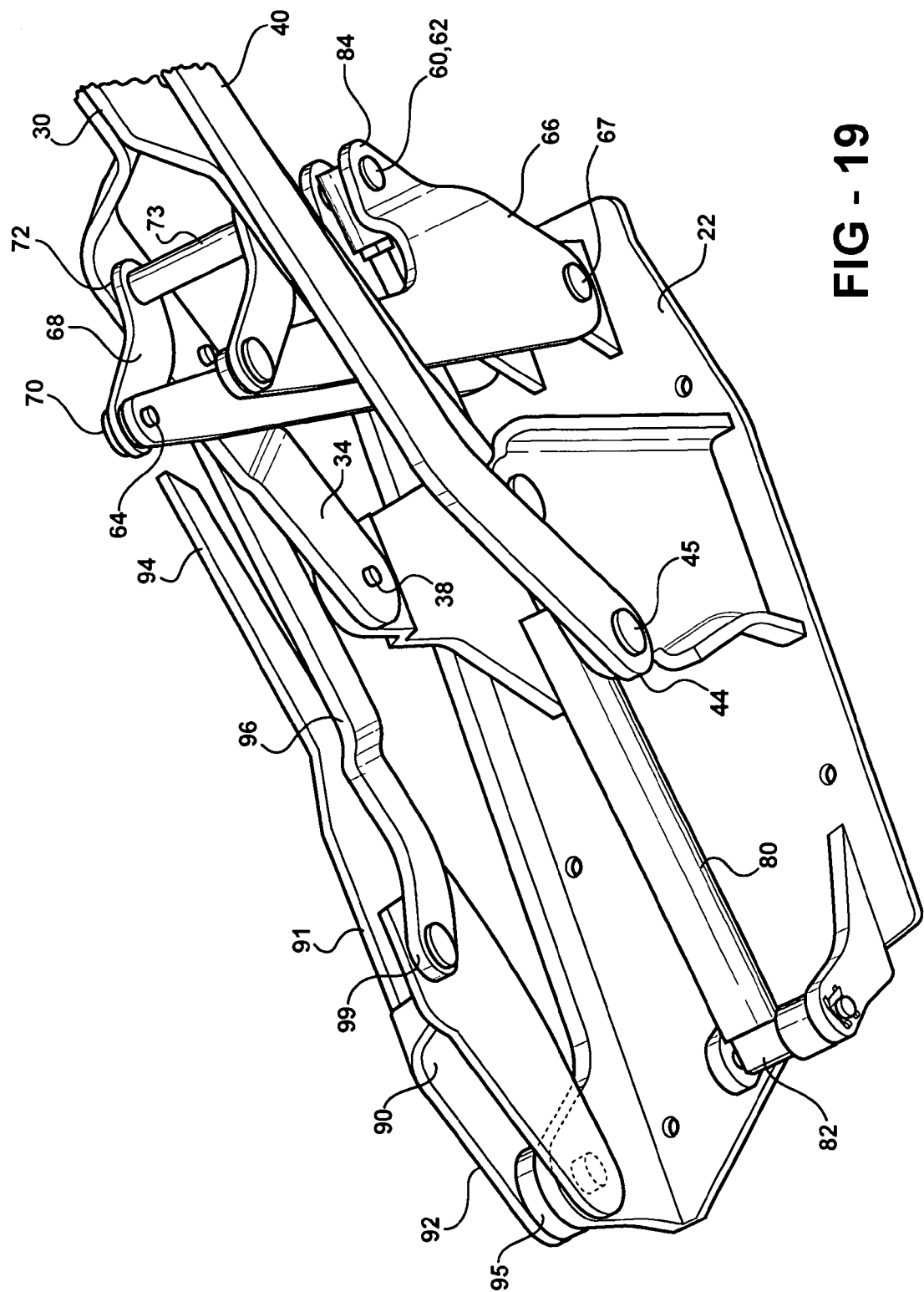
FIG. 19 is an enlarged top elevational view of the retracting mechanism showing an opposite side of that shown in FIG. 17.

As best shown in FIG. 16, a rear link 90 includes a middle portion 91 that extends between a proximal end 92 and an opposite distal end 94. A pivot pin 95 pivotally interconnects the proximal end 92 of the rear link 90 to the base bracket 22. The rear section 16 is fixedly carried by the rear link 90. A transfer link 96 interconnects the center link 30 and the rear link 90, such that the rear link 90 and the rear section 16 of the top 10 pivot about the pivot pin 95 in response to corresponding pivotal movement of the center link 30 about the pivot pin 38. More specifically, the transfer link 96 extends between opposite front 98 and rear 99 ends. The front end 98 is pivotally coupled to the center link 30 between the pivot pin 73 and the second end 34 of the center link 30. The rear end 99 is pivotally coupled to the middle portion 91 of the rear link 90.

In use, the retracting mechanism 20 allows selective movement and support of the top 10 in a closed position, an open position and any of one of a plurality of intermediate positions therebetween. The top 10 is shown in the closed position in FIGS. 1 through 5, the open position in FIGS. 14 and 15 and the intermediate positions in FIGS. 6 through 13. A description of the movement of the top from the closed position to the open position follows.

Figure 14:
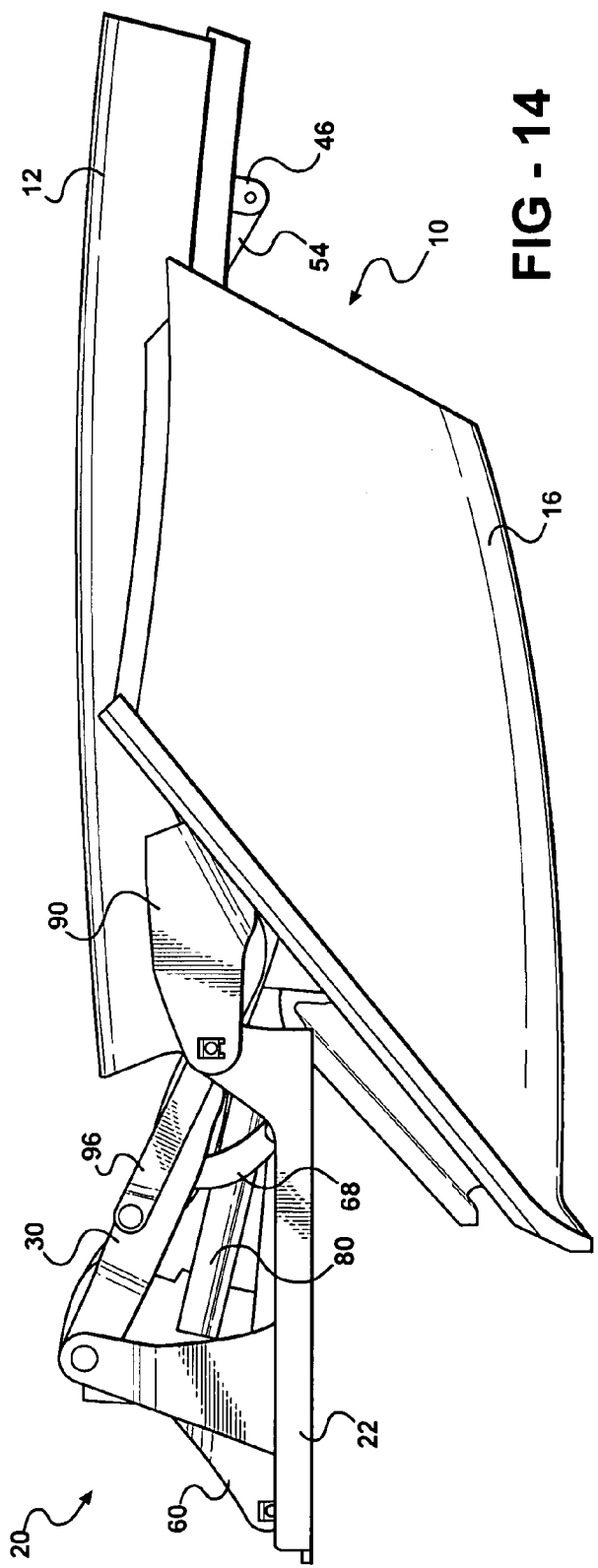
FIG. 14 is a side elevational view of the top in the retracted position.
Figure 15:
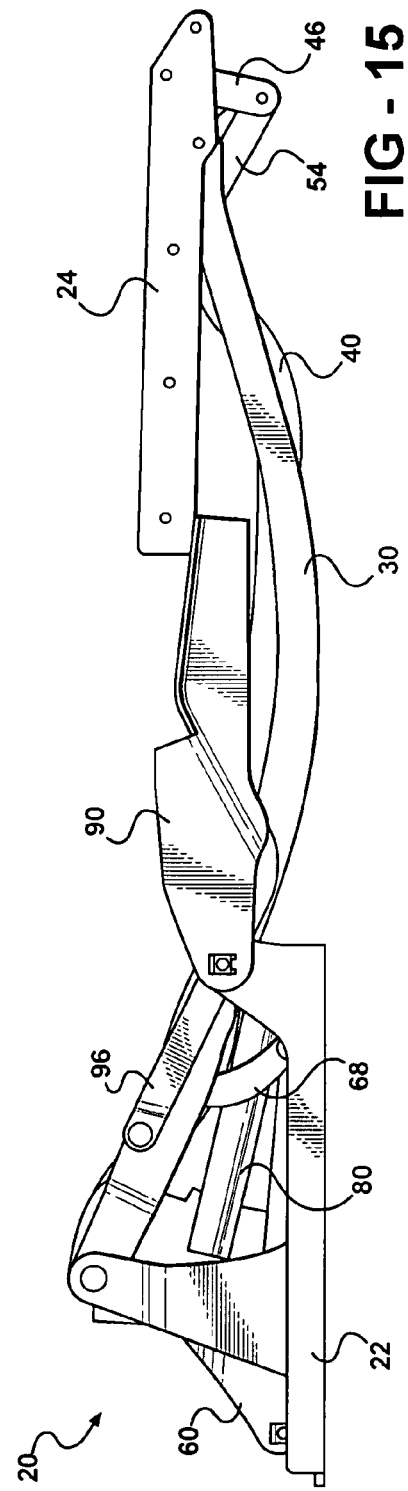
FIG. 15 is a side elevational view of the retracting mechanism in the same position as the top in FIG. 14.

In the closed position shown in FIGS. 1-5, the top 10 is extended in a generally fore and aft direction in the vehicle and the front section 12 is releasably locked along a top edge of a windshield of the vehicle, as commonly known by those skilled in the art. To open the top 10, the front section 12 of the top 10 is first unlocked from the top edge of the vehicle windshield. The actuator 80 is energized by selective actuation of a suitable switch disposed in the vehicle interior. The actuator 80 causes the knee link 60 to pivot clockwise, as viewed in the figures, about the pivot pin 67. The clockwise movement of the knee link 60 tensions the swing arm 68, which in turn translates into clockwise movement of the center link 30 and the middle section 14 about the pivot pin 38. In response, the balance link 40 pivots counterclockwise about the pivot pin 45 due to the second articulating link 54 interconnecting the balance link 40 and the center link 30. The first 46 and second 54 articulating links, the center link 30 and the balance link 40 collectively define a four bar linkage arrangement, which causes the side member 24 and front section 12 to pivot counterclockwise about the pivot pin 36 as the center link 30 and balance link 40 pivot clockwise about their respective pivot pins 38, 45. The rear link 90 and the rear section 16 pivot clockwise about the pivot pin 95 in response to the clockwise rotation of the center link 30 about the pivot pin 38 due to the transfer link 96 interconnecting the center link 30 and the rear link 90. In concert, the front section 12 closes in a clamshell-like manner relative to the middle section 14, the rear section 16 pivots clockwise about the pivot pin 95, and the middle section 14 pivots clockwise in a rearward direction about the pivot pin 38 until the sections 12, 14 and 16 are stacked in the open position, as shown in FIGS. 14 and 15. The top 10 can be moved to the closed position by reversing the foregoing steps.

As will be clear to those of skill in the art, the embodiments of the present invention shown and discussed herein may be altered in various ways without departing from the scope of the present invention.

We claim:

1. A vehicle provided with either a retractable hard top or a retractable soft top during manufacture, the vehicle having a windshield, a storage area and a passenger compartment therebetween, the vehicle comprising:
one of:
   a retractable soft top movable between an extended position to define a roof over the passenger compartment and a retracted position wherein at least a portion of the soft top version is disposed in the storage area, the soft top version comprising:
      a rear section having opposite forward and rearward edges, the rear section having opposite inner and outer surfaces, the rear section having opposite side edges, the inner surface facing the passenger compartment when the soft top version is in the extended position, the rear section being a rigid panel extending between the side edges and between the forward and rearward edges;
      a front section disposed forwardly of the rear section when the top is in the extended position, the front section having opposite inner and outer surfaces, the inner surface facing the passenger compartment when the soft top version is in the extended position; and
      a flexible roof membrane covering at least the outer surface of the front section when the soft top version is in the extended position; and
   a retractable hard top movable between an extended position to define a roof over the passenger compartment and a retracted position wherein at least a portion of the hard top version is disposed in the storage area, the hard top version comprising:
      a plurality of roof sections including at least a front section and a rear section, each of the roof sections having opposite forward and rearward edges, each of the roof sections having a pair of opposite side edges extending between the forward and rearward edges, each roof section being a rigid panel extending between the respective forward and rearward edges and side edges;
   a linkage for articulating the top between the extended and retracted positions, the linkage being substantially the same for the hard top and the soft top.

2. A vehicle as set forth in claim 1 wherein the linkage includes:
   a side member extending between opposite front and rear ends to support the front section of either the soft and hard top versions;
   a balance link having opposite first and second ends, the first end of the balance link being pivotally coupled to the body of the vehicle;
   a center link having opposite first and second ends, the first end of the center link being pivotally coupled to the body of the vehicle; and
   first and second articulating links operatively coupled between the side member, the balance link, and the center link to provide movement of the top versions between the extended and retracted positions.

3. A vehicle as set forth in claim 2, wherein the first articulating link has one end pivotally coupled to the balance link and an opposite end pivotally connected to the rear end of the side member.

4. A vehicle as set forth in claim 3, wherein the second articulating link has one end pivotally coupled to the balance link and an opposite end pivotally coupled to the center link.

5. A vehicle as set forth in claim 4, wherein said first and second articulating links are pivotally coupled to the balance link by a common pivot pin.

6. A vehicle as set forth in claim 2, wherein the side member remains substantially aligned in a fore and aft direction with respect to the vehicle throughout movement between the extended and retracted positions.

7. A vehicle as set forth in claim 1, wherein the hard top version includes a middle section that extends fore and aft between the front and rear sections and laterally between opposite sides that are aligned with the side edge of the front and rear sections, when the top is in the extended position.

8. A vehicle as set forth in claim 2, wherein the hard top version includes a middle section that extends fore and aft between the front and rear sections and laterally between opposite sides that are aligned with the side edge of the front and rear sections, when the top is in the extended position, the middle section being interconnected with the center link.

9. A vehicle as set forth in claim 8, wherein at least one of the first and second ends of the center link remains forward of the corresponding first and second ends of the balance link.

10. A vehicle as set forth in claim 8, wherein both first and second ends of the center link remain forward of the corresponding first and second ends of the balance link.

11. A vehicle as set forth in claim 1, wherein the front and rear sections of the soft top version are spaced apart to define an open space therebetween.

12. A vehicle as set forth in claim 2, wherein the front and rear sections of the soft top version are spaced apart to define an open space therebetween.

13. A vehicle as set forth in claim 12, wherein the soft top version further includes a bow coupled to the center link for supporting the flexible roof membrane when the top is in the extended position.

14. A vehicle as set forth in claim 2, further including a rear link pivotally coupled to body of the vehicle.

15. A vehicle as set forth in claim 14, wherein the rear section is supported by the rear link for movement therewith between the extended and retracted positions.

16. A vehicle as set forth in claim 15, including a transfer link coupled between the center link and the rear link to cause pivotal movement of the rear section in response to corresponding pivotal movement of the center link between the extended and retracted positions.

17. A retractable top for an automotive vehicle having a passenger compartment extending in a fore and aft direction between a front windshield and a storage compartment, the retractable top being movable between an extended position covering the passenger compartment and a retracted position disposed in a stacked manner in the storage compartment, the retractable top comprising:
   a front section;
   a rear section;
   a middle section disposed between the front and rear sections while the top is in the extended position; and a retracting mechanism comprising:
- a side member extending between opposite front and rear ends to support the front section of the retractable top;
- a balance link and a center link each having a first end pivotally coupled to the vehicle and a second end operatively connected to the side member to provide movement of the side member with the balance and center links between the extended and retracted positions, wherein at least one of the first and second ends of the center link remains forward of the corresponding first and second ends of the balance link while supporting the middle section
- wherein the retracting mechanism includes first and second articulating links interconnecting the side member, the balance link, and the center link so that the side member remains substantially aligned in a fore and aft direction with respect to the vehicle throughout movement between the extended and retracted positions.

18. A retractable top as set forth in claim 17, wherein the first articulating link has one end pivotally coupled to the balance link and an opposite end pivotally connected to the rear end of the side member.

19. A retractable top as set forth in claim 17, wherein the second articulating link has one end pivotally coupled to the balance link and an opposite end pivotally coupled to the center link.

20. A retractable top as set forth in claim 17, wherein said first and second articulating links are pivotally coupled to the balance link by a common pivot pin.

21. A retractable top system as set forth in claim 17, wherein the front and rear sections are spaced apart to define a space therebetween.

22. A retractable top system as set forth in claim 21 including a membrane covering at least the open space and the front section.

23. A retractable top system as set forth in claim 17 wherein the front, middle and rear sections are substantially rigid panels.

24. A retractable top system as set forth in claim 17 including a rear link pivotally coupled to body of the vehicle.

25. A retractable top system as set forth in claim 24, wherein the rear section is supported by the rear link for movement therewith between the extended and retracted positions.

26. A retractable top for an automotive vehicle having a passenger compartment extending in a fore and aft direction between a front windshield and a storage compartment, the retractable top being movable between an extended position covering the passenger compartment and a retracted position disposed in a stacked manner in the storage compartment, the retractable top comprising:
- a front section;
- a rear section;
- a middle section disposed between the front and rear sections while the top is in the extended position; and
- a retracting mechanism comprising:
  - a side member extending between opposite front and rear ends to support the front section of the retractable top;
  - a balance link and a center link each having a first end pivotally coupled to the vehicle and a second end operatively connected to the side member to provide movement of the side member with the balance and center links between the extended and retracted positions, wherein at least one of the first and second ends of the center link remains forward of the corresponding first and second ends of the balance link while supporting the middle section,
- wherein the front and rear sections are spaced apart to define a space therebetween and include a membrane covering at least the open space and the front section, the middle section having a bow coupled by the center link for supporting the membrane covering.

27. A retractable top for an automotive vehicle having a passenger compartment extending in a fore and aft direction between a front windshield and a storage compartment, the retractable top being movable between an extended position covering the passenger compartment and a retracted position disposed in a stacked manner in the storage compartment, the retractable top comprising;
- a front section;
- a rear section;
- a middle section disposed between the front and rear sections while the top is in the extended position; and
- a retracting mechanism comprising:
  - a side member extending between opposite front and rear ends to support the front section of the retractable top;
  - a balance link and a center link each having a first end pivotally coupled to the vehicle and a second end operatively connected to the side member to provide movement of the side member with the balance and center links between the extended and retracted positions, wherein at least one of the first and second ends of the center link remains forward of the corresponding first and second ends of the balance link while supporting the middle section;
  - a rear link pivotally coupled to the body of the vehicle and supporting the rear section for movement between the extended and retracted positions; and
  - a transfer link coupled between the center link and the rear link to cause pivotal movement of the rear panel in response to corresponding pivotal movement of the center link between the extended and retracted positions.

28. A vehicle provided with either a retractable hard top or a retractable soft top during manufacture the vehicle having a windshield, a storage area and a passenger compartment therebetween, the vehicle comprising:
- one of either a retractable soft top or a retractable hard top version; and
- a linkage that is substantially the same for both the soft top and hard top to allow selective movement of the tops between an extended position to define a roof over the passenger compartment and a retracted position wherein at least a portion of the top versions is disposed in the storage area.

29. A retracting mechanism for a retractable top of an automotive vehicle, which allows selective movement of the top between an extended position covering a passenger compartment and a retracted position disposed in a storage compartment behind the passenger compartment, the retracting mechanism comprising:
- a side member extending between opposite front and rear ends;
- a balance link having opposite first and second ends, the first end of the balance link being pivotally coupled to the vehicle;
- a center link having opposite first and second ends, the first end of the center link being pivotally coupled to the vehicle; and first and second articulating links operatively coupled between the side member, the balance link, and the center link to provide movement of the top versions between the extended and retracted positions, the first and second articulating links each being pivotally coupled to the balance link by a common pivot pin.

30. A retracting mechanism as set forth in claim 29, wherein the first articulating link has one end pivotally coupled to the balance link by the common pivot pin and an opposite end pivotally connected to the rear end of the side member.

31. A retracting mechanism as set forth in claim 29, wherein the second articulating link has one end pivotally coupled to the balance link by the common pivot pin and an opposite end pivotally coupled to the center link.

32. A retracting mechanism as set forth in claim 29, wherein at least one of the first and second ends of the center link remains forward of the corresponding first and second ends of the balance link throughout movement of the top between the extended and retracted positions.

33. A retracting mechanism as set forth in claim 32, wherein the center link is directly coupled to a portion of the retractable top.

34. A vehicle provided with either a retractable hard top or a retractable soft top during manufacture, the vehicle having a windshield, a storage area and a passenger compartment therebetween, the vehicle comprising:
a top having:
a rear section having opposite forward and rearward edges, opposite inner and outer surfaces, and opposite side edges, wherein the inner surface is arranged to face the passenger compartment when the retractable top assembly is disposed in the extended position;
a front section disposed forwardly of and spaced from the rear section when the retractable top assembly is disposed in the extended position, the front section having opposite inner and outer surfaces and opposite side edges, wherein the inner surface is arranged to face the passenger compartment when the retractable top assembly is disposed in the extended position; and
a middle section selected from one of a bow disposed in the space between the front section and rear section and a rigid roof section disposed between the front section and rear section, wherein the soft top is provided when the bow is selected and the hard top is provided when the rigid roof section is selected; and
a linkage for articulating the hard top or the soft top between an extended and retracted position, the linkage comprising:
a side member extending between opposite front and rear ends to support the front section;
a balance link having opposite first and second ends, the first end of the balance link being pivotally coupled to the body of the vehicle;
a center link having opposite first and second ends, the first end of the center link being pivotally coupled to the body of the vehicle; and
first and second articulating links operatively coupled between the side member, the balance link, and the center link to provide movement of the top between the extended and retracted positions.

35. A vehicle as set forth in claim 34, wherein the rear section and the front section each comprises a rigid panel extending between the side edges.

36. A vehicle as set forth in claim 34, wherein the soft top further comprises a flexible roof membrane covering at least the outer surface of the front section and the middle section when the retractable top assembly is disposed in the extended position.

37. A vehicle as set forth in claim 34, wherein the first articulating link has one end pivotally coupled to the balance link and an opposite end pivotally connected to the rear end of the side member.

38. A vehicle as set forth in claim 34, wherein the second articulating link has one end pivotally coupled to the balance link and an opposite end pivotally coupled to the center link.

39. A vehicle as set forth in claim 34, wherein the first and second articulating links are pivotally coupled to the balance link by a common pivot pin.

40. A vehicle as set forth in claim 34, wherein the side member remains substantially aligned in a fore and aft direction with respect to the vehicle throughout movement between the extended and retracted positions.

41. A vehicle as set fort in claim 34, wherein the middle section is interconnected to the center link and at least one of the first and second ends of the center link remains forward of the corresponding first and second ends of the balance link.

42. A vehicle as set forth in claim 34, wherein the middle section is interconnected to the center link and both first and second ends of the center link remain forward of the corresponding first and second ends of the balance link.

43. A vehicle as set forth in claim 34, further including a rear link pivotally coupled to body of the vehicle.

44. A vehicle as set forth in claim 43, wherein the rear section is supported by the rear link for movement therewith between the extended and retracted positions.

45. A vehicle as set forth in claim 44, including a transfer link coupled between the center link and the rear link to cause pivotal movement of the rear section in response to corresponding pivotal movement of the center link between the extended and retracted positions.

* * * * *